United States Patent [19]

O'Brien et al.

[11] Patent Number: 6,038,639
[45] Date of Patent: Mar. 14, 2000

[54] DATA FILE STORAGE MANAGEMENT SYSTEM FOR SNAPSHOT COPY OPERATIONS

[75] Inventors: John Timothy O'Brien, Louisville; Jay Stuart Belsan, Nederland; Michael Steven Milillo, Louisville, all of Colo.

[73] Assignee: Storage Technology Corporation, Louisville, Colo.

[21] Appl. No.: 08/925,787

[22] Filed: Sep. 9, 1997

[51] Int. Cl.[7] ..................................................... G06F 12/00
[52] U.S. Cl. ........................... 711/114; 711/206; 711/207; 711/208; 711/4
[58] Field of Search .................................... 711/206, 207, 711/208, 4, 114; 707/204; 364/236.2

[56] References Cited

U.S. PATENT DOCUMENTS 5,193,184  3/1993  Belsan et al. ................................. 711/4
5,210,866  5/1993  Milligan et al. ....................... 364/236.2
5,403,639  4/1995  Belsan et al. ............................ 707/204
5,410,667  4/1995  Belsan et al. ............................ 711/114

FOREIGN PATENT DOCUMENTS 0 361 683 A2  4/1990  European Pat. Off. ........ G06F 11/14
WO 96/12232  4/1996  WIPO .............................. G06F 12/16

OTHER PUBLICATIONS

Ritchie, Dennis M.: Ken Thompson; The UNIX Time–Sharing System, Association for Computing Machinery, Inc., pp. 1–8, 1974.

Leffler, Samuel J.; Marshall Kirk McKusick; Michael J. Karels; John S. Quarterman; The Design and Implementation of the 4.3BSD UNIX Operating System, Addison–Wesley Publishing Company; 1989; pp. 187–205.

Primary Examiner—John W. Cabeca
Assistant Examiner—Nasser Moazzami
Attorney, Agent, or Firm—Timothy R. Schulte; Wayne P. Bailey; James M. Graziano

[57] ABSTRACT

The present data file storage management system for snapshot copy operations maintains a two level mapping table which enables the data files to be copied using the snapshot copy process and only having to update a single corresponding mapping table entry when the physical location of the data file is changed. The snapshot copy updates to the contents of the first level of the two level mapping table are stored on the backend data storage devices to provide a record of the snapshot copy operation which can be used to recover the correct contents of the mapping table. This record of the snapshot copy operations remains valid even though the physical location of a copied data file instance is subsequently changed. Furthermore, the physical storage space holding the updated portions of the first level of the two level mapping table can be managed using techniques like those used to manage the physical storage space holding data file instances. Mapping table updates resulting from the snapshot copy operation are delayed until all mapping table updates resulting from earlier data file write operations have been completed and any attempt to update the mapping table to reflect data written to the original data file or the copy data file that occurs after initiation of the copy must wait until the first set of mapping table pointers have been copied.

28 Claims, 14 Drawing Sheets

| LCD ENTRY TYPE = VIRTUAL TRACK INSTANCE |
|---|
| VIRTUAL TRACK ADDRESS |
| TRACK NUMBER |
| LOGICAL ADDRESS |
| VIRTUAL TRACK INSTANCE LENGTH |

| LCD ENTRY TYPE = VTT PAGE INSTANCE |
|---|
| VTT PAGE IDENTIFIER |
| ORIGINAL LCSN |
| LOGICAL ADDRESS |

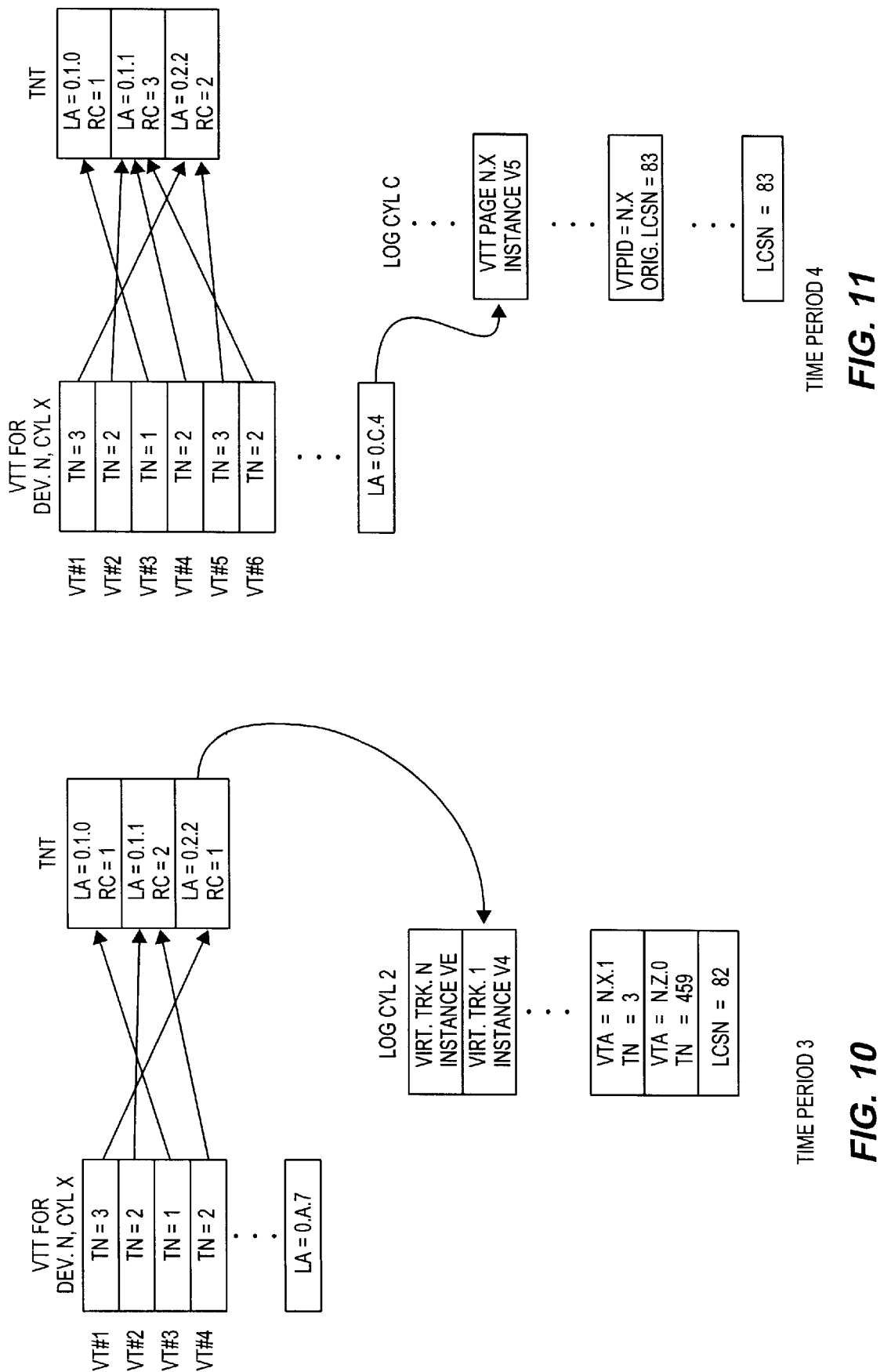

DATA FILE STORAGE MANAGEMENT SYSTEM FOR SNAPSHOT COPY OPERATIONS

FIELD OF THE INVENTION

This invention relates to a data storage subsystem which uses a snapshot copy process to copy a data file by duplicating the data file pointer in a mapping table to reference the original data file, such that the name used to identify the original data file and the name used to identify the copied data file are both mapped to the same physical data storage location. The integrity of the mapping table is maintained by the use of a redundantly stored two level mapping table which enables a data file to be relocated with only a simple change to a single entry in the mapping table, even when there are multiple data file names which refer to the data file.

Problem

It is a problem in computer systems and data storage subsystems to perform the data file copy operation in a manner that minimizes the use of processing resources and data storage space in memory. In the past, data files were copied in their entirety by the processor, such that two exact copies of the selected data file were resident in memory. This operation consumed twice the amount of memory for the storage of two identical copies of the data file and also required the intervention of the processor to effect the copy of the original data file.

An improvement over this copy process was the data file snapshot copy process disclosed in U.S. Pat. No. 5,410,667, wherein a dynamically mapped virtual data storage subsystem stored data files received from a processor in backend data storage devices by mapping the processor assigned data file identifier to a logical address that identifies the physical storage location of the data. This dynamically mapped virtual data storage subsystem performed a copy of a data file by simply creating a duplicate data file pointer in a data file identifier in a mapping table to reference the original data file. In this dynamically mapped virtual data storage subsystem, the data files are referred to as virtual tracks and each data file is identified by a unique Virtual Track Address. The use of a mapping table provides the opportunity to replace the process of copying the entirety of a data file in the data storage devices with a process that manipulates the contents of the mapping table. A data file appears to have been copied if the name used to identify the original data file and the name used to identify the copy data file are both mapped to the same physical data storage location. This enables the processor to access the data file via two virtual track addresses while only a single physical copy of the data file resides on the backend data storage devices in the data storage subsystem. This process minimizes the time required to execute the copy operation and the amount of memory used since the copy operation is carried out by creating a new pointer to the original data file and does not require any copying of the data file itself.

A problem with this copy system is that only the information stored in the mapping table identifies the fact that the data file has been copied. If the mapping table is lost or its contents corrupted, the effect of the data file copy operation is lost. This problem can be avoided if the data storage subsystem stores the data file copy information in the data file itself to thereby replicate the mapping table data. However, such a process requires that the original data file be updated to reflect each copy operation that is executed and this overhead reduces the benefit of the pointer manipulation. Furthermore, any updates or changes to a data file in a log structured file system results in the entirety of the data file being rewritten in memory. Therefore, a log structured file system does not benefit from this replication of the mapping data.

A further problem with this copy system is that the process of updating mapping table pointers to emulate the copying of data files requires a finite amount of processing time. It is therefore desirable for the processor to execute read and write operations during the process of updating the mapping table pointers, and this interleaved copy operation is termed an incremental copy process. This interleaving of operations can create instances in which the original data file (source area) is being written or the copy data file (target area) is being read or written before the mapping table update is completed. In this instance, data written to the original data file before the completion of the mapping table updates may or may not be reflected in the copy data file. The copy data file also now occupies its own unique physical space in memory (target area) since it does not correspond to the original data file. Similarly, data read from the copy data file before the completion of the mapping table updates may be the data file being copied or the data file which was stored in the target area before the copy operation was initiated. Furthermore, data written to the copy data file before the completion of the mapping table updates may or may not be overwritten by the data file being copied. This results in uncertainty with regard to the correspondence between the original data file, its modified version and the copy data file. This incremental copy process is therefore less desirable than a point in time copy process where the identity between the original and copy data files is ensured. With a point in time copy process, all data written to the copy source area before the initiation of the copy operation will appear in the copy target area, all data written to the copy target area before the initiation of the copy will be overwritten by data from the copy source area, no data written to the copy source area after the initiation of the copy will appear in the copy target area and no data written to the copy target area after the initiation of the copy process will be overwritten by data from the copy source area. It is therefore desirable to provide an incremental copy process which interleaves read and write operations with the mapping table updates, but also preserves the point in time snapshot copy semantics to ensure correspondence of the copy and original data files during the mapping table updates.

Another problem with the incremental copy process is that this process can bypass security policies that block unauthorized data access. For example, a certain group of users may have access to a data file that was previously stored in the memory location now used for the copy data file. These users can access the copy data file that is being written to this area as part of the incremental copy process if the mapping table pointers, with its file access permissions, has not yet been updated. Thus, the access permission process is not synchronized with the copy process and users can access files for which they are not authorized.

Thus, there presently is no snapshot copy process available that both efficiently ensures the reliability of the mapping table data and also performs an incremental copy process which preserves the point in time copy semantics to ensure copy data file correspondence to the original data file.

Solution

The above described problems are solved and a technical advance achieved by the present data file storage management system for snapshot copy operations. This system maintains a two level mapping table which enables the data files to be copied using the snapshot copy process but only requires the update of a single corresponding mapping table entry when the physical location of the data file instance is changed. The snapshot copy updates to the contents of the first level of the two level mapping table are stored on the backend data storage devices to provide a record of the snapshot copy operation which can be used to recover the correct contents of the mapping table. This record of the snapshot copy operation remains valid even though the physical location of a copied data file instance is subsequently changed. Furthermore, the physical storage space holding the updated portions of the first level of the two level mapping table can be managed using techniques like those used to manage the physical storage space holding data file instances. In addition, the synchronization of the snapshot copy operation with the reading and writing of data to the original and copy data files is maintained by detecting accesses to the original data file or the copy data file during the time that the snapshot copy process is being executed and the mapping table is being updated. Mapping table updates resulting from the snapshot copy operation are delayed until all mapping table updates resulting from earlier data file write operations have been completed and any attempt to update the mapping table to reflect data written to the original data file or the copy data file that occurs after initiation of the snapshot copy operation must wait until the first set of mapping table pointers have been updated.

The present data file storage management system for snapshot copy operations is implemented in a dynamically mapped virtual data storage subsystem to maintain data file copy integrity in snapshot copy operations. The data storage subsystem is connected to at least one processor and functions to store data files for the processor in the backend data storage devices that are part of the data storage subsystem. The processor assigns a virtual track address to a data file which is transmitted to the data storage subsystem for storage in an allocated physical storage location in the backend data storage devices. The assignment of a physical storage location on the backend data storage devices is effected by a controller contained within the data storage subsystem, which defines the correspondence between the processor assigned virtual track address and the logical address of the stored data file. A mapping table translates the virtual track address into a logical address which identifies the location of the data file on a physical disk drive. The location of the data file changes as the data storage subsystem free space collection process moves the data file to create free space into which new data can be written. It is therefore insufficient to store the translation from a virtual address to a logical address as a means of preserving a record of the mapping table updates, since the free space collection process changes the physical location of the data file but does not update these translations. The data files stored on the disk drives must therefore contain information that is independent of the logical address at which the data file presently being copied is stored. This enables the disk stored information to remain valid even though the physical location of the data file may change over time. This is accomplished by the use of a two level mapping architecture. The first level of mapping tables maps a virtual address to an immutable name which identifies a unit of data, such as a virtual track. The second level of mapping tables maps the immutable name to a given logical address. The snapshot copy operation operates on the first level of the mapping table to create multiple copies of the virtual track, thereby eliminating the need to associate with each virtual track address a mapping table entry which contains a logical address.

In a snapshot copy operation, to provide the illusion of there being two independent copies of the data, any write to one of the copies must leave the other copy unchanged. In a log structured file system, the writing of data or changes to a data file results in the data file being written to a different location in memory. If the original data file is accessible by a plurality of virtual addresses, it must remain in its original form for access by the remaining users, while the changes to this data file must be reflected in a new copy of the data file which incorporates these changes. The mapping table must therefore be updated in such a manner that the virtual address of the new data file points to this new copy of the data file, while the remaining virtual addresses point to the original data file location.

The problem of providing point in time copy semantics for the snapshot copy operation is solved by completing data file accesses that are already in progress before initiating the mapping table updates performed by the snapshot copy process and detecting accesses to the original data file or the copy file during the time that the snapshot copy process is being executed and the mapping table is being updated. The mapping table updates performed by the snapshot copy process are delayed until the completion of the data file accesses that preceded the command that initiated the snapshot copy process and any attempt to update the mapping table to reflect data written to the original data file or the copy data file that occurs after initiation of the snapshot copy process must wait until the first set of mapping table pointers have been updated. This ensures that the data file access operations behave as though data file access operations initiated before the snapshot copy operation were completed before the initiation of the snapshot copy operation and all data file access operations initiated after the initiation of the snapshot copy operation were initiated after the completion of the snapshot copy operation. The use of a fault tolerant cache allows this write delay to be hidden from the processor. Any request to read data from the copy data file received before the mapping table pointers have been updated is redirected to the original data file to ensure that the data file read operation behaves as though the snapshot copy process had been completed.

Thus, the present data file storage management system for snapshot copy operations both efficiently ensures the reliability of the mapping table data and also performs an incremental copy process which preserves the point in time copy semantics to ensure copy data file correspondence to the original data file.

BRIEF DESCRIPTION OF THE DRAWING

FIGS. 8–13 illustrate in block diagram form the state of the mapping table at various stages of a snapshot copy operation;

DETAILED DESCRIPTION

Figure 1:
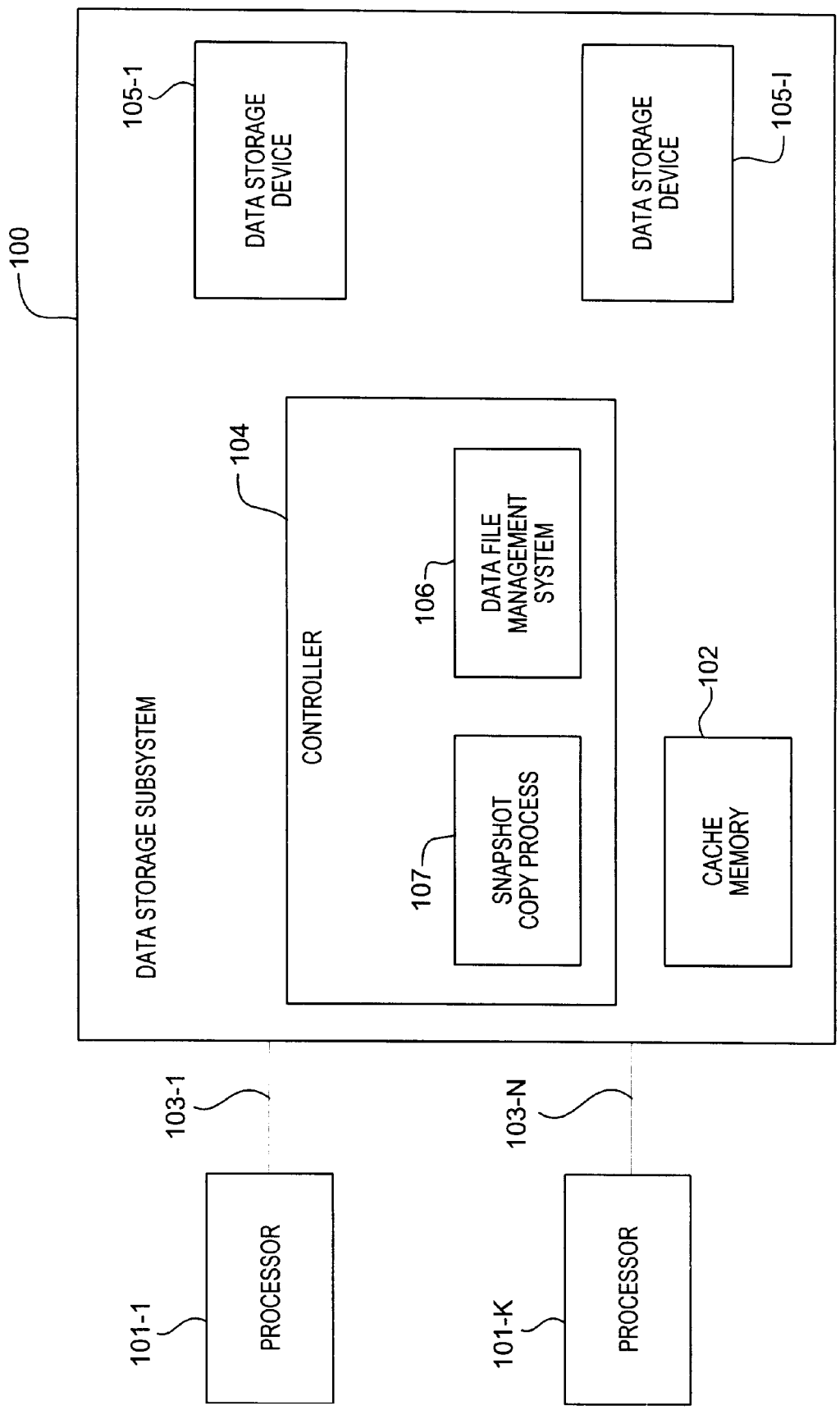
FIG. 1 illustrates in block diagram form the architecture of a typical data storage subsystem in which the present data file storage management system for snapshot copy operations is implemented.

The present data file storage management system for snapshot copy operations maintains a two level mapping table which enables the data files to be copied using the snapshot copy process but only requires the update of a single corresponding mapping table entry when the physical location of the data file instance is changed. The snapshot copy updates to the contents of the first level of the two level mapping table are stored on the backend data storage devices to provide a record of the snapshot copy operation which can be used to recover the correct contents of the mapping table. This record of the snapshot copy operation remains valid even though the physical location of a copied data file instance is subsequently changed. Furthermore, the physical storage space holding the updated portions of the first level of the two level mapping table can be managed using techniques like those used to manage the physical storage space holding data file instances. In addition, the synchronization of the snapshot copy operation with the reading and writing of data to the original and copy data files is maintained by detecting accesses to the original data file or the copy file during the time that the snapshot copy process is being executed and the mapping table is being updated. Mapping table updates resulting from the snapshot copy operation are delayed until all mapping table updates resulting from earlier data file write operations have been completed and any attempt to update the mapping table to reflect data written to the original data file or the copy data file that occurs after initiation of the snapshot copy operation must wait until the first set of mapping table pointers have been updated.

Data Storage Subsystem Architecture

The present data file storage management system for snapshot copy operations 106 is implemented in a dynamically mapped virtual data storage subsystem 100 which is connected to at least one processor 101 and which functions to store data files for the processor 101 in the backend data storage devices 105 that are part of the data storage subsystem 100. The processor transmits a data file for storage in the data storage subsystem 100 over a selected one of the data channels 103 which serve to interconnect the processor 101 with the data storage subsystem 100. The processor 101 assigns a virtual track address to the data file transmitted to the data storage subsystem 100 and the received data file is stored in an allocated physical storage location in the backend data storage devices 105 contained in the data storage subsystem 100. The assignment of a physical storage location on the backend data storage devices 105 is effected by a controller 104 contained within the data storage subsystem 100, which defines the correspondence between the processor 101 assigned virtual track address and the logical address of the stored data file. This translation of the virtual track address to the logical address corresponding to the physical storage location comprises the "dynamically mapped virtual" aspect of the data storage subsystem 100. A cache memory 102 is included in the data storage subsystem 100 to provide temporary storage for data files as well as data used by the controller 104. The present data file storage management system for snapshot copy operations 106 is implemented, in part, in the controller 104, with the exact implementation details of this system being a matter of engineering choice.

Snapshot Copy Process

Figure 2:
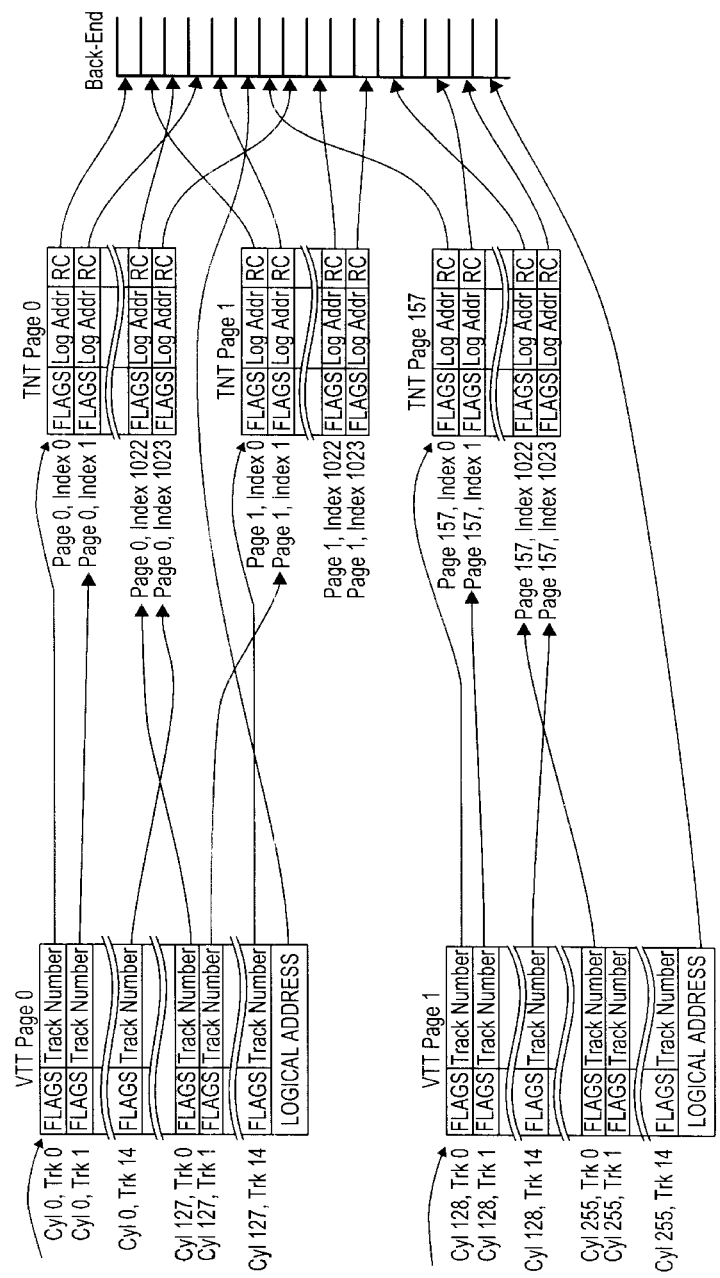
FIG. 2 illustrates in block diagram form the implementation of the two level mapping table as a Virtual Track Table and a Track Number Table.

The snapshot copy process 107 is implemented by the use of a two level mapping architecture. The first level of mapping maps the processor 101 provided virtual address to an immutable name which identifies a unit of data, such as a virtual track. The second level of mapping maps the immutable name to a given logical address. The snapshot copy operation operates on the first level of the mapping table, thereby eliminating the need to associate with each virtual track address a mapping table entry which contains a logical address. The two mapping tables used to implement the two level mapping table, as shown in FIG. 2, are the Virtual Track Table and the Track Number Table. The Virtual Track Table is indexed using the processor 101 provided virtual track address which then provides a unique immutable name, comprising a Track Number, that is used as the index for the Track Number Table. The Track Number is valid for the life of the virtual track instance, as determined by the reference count contained in the Track Number Table. The reference count represents the number of times a virtual track instance (physical copy of the received data file) appears as a virtual track to the processor 101.

There are three sources for updates to the Virtual Track Table: snapshot copy, data file delete, and normal processor 101 write activity. When the processor 101 writes to an existing virtual track, the data file storage management system for snapshot copy operations 106 must check the reference count in the Track Number Table entry pointed to by the Track Number associated with that virtual track address. If the reference count is one, no other virtual tracks share the storage of the virtual track instance, therefore the new virtual track instance simply uses the same track number and the Track Number Table entry is updated to reflect the new logical address for this data file. The old logical address of the data file now contains invalid data (old virtual track instance) and the data storage subsystem 100 free space collection process eventually discards this old virtual track instance. If the processor 101 writes to a virtual track which has a reference count greater than one or writes to a track that has never been assigned a track number, a new track number must be assigned to the new virtual track instance. The data file storage management system for snapshot copy operations 106 decrements the reference count for the track number originally associated with the virtual track address (if any) to remove this virtual track's usage of the old virtual track instance. The data file storage management system for snapshot copy operations 106 then acquires an unused Track Number, which is assigned to the virtual track's address in the Virtual Track Table. There is one Track Number for each possible virtual track instance that is defined by the present virtual device configuration. If processor 101 instructs data storage subsystem 100 to delete a virtual track, data file management system for snapshot copy operations 106 decrements the reference count for the track number associated with the Virtual Track Address (if any) to remove this virtual track's usage of the virtual track instance. Data file management system for snapshot copy operations 106 then removes the association between the Virtual Track Address and the Track Number which previously identified the virtual track instance selected by the Virtual Track Address.

The benefits of a two level mapping table are:

1. Snapshot copy operations are performed without having to write new instances of the virtual tracks involved in the copy.
2. Error recovery capability of the mapping table. A copy is made of the mapping table Virtual Track Table and this data is written to the disks of the backend data storage devices 105 as with other data. The mapping table data is thereby recoverable the same as virtual track instances.
3. The number of copies of a virtual track instance is determined solely by the size of the reference count field.

Virtual Track Table

FIG. 2 illustrates in block diagram form the implementation of a two level mapping table in the present data file storage management system for snapshot copy operations 106. The first level of the mapping table, comprising the Virtual Track Table, provides the mapping from the individual virtual addresses provided by the processor 101 to an immutable name which is used to index the corresponding entry in the second level of the two level mapping table. The second level of the mapping table, comprising the Track Number Table, provides the mapping from the immutable name stored in the Virtual Track Table to the logical address which identifies the physical storage location in the backend data storage devices 105 that contains the received virtual track instance.

In the example provided herein, the processor 101 stores virtual tracks, which are associated with a virtual device, in the data storage subsystem 100. The Virtual Track Address, assigned by processor 101 to a virtual track, identifies a particular track by assigning the track a virtual cylinder number and a virtual track number. For each virtual device defined by the processor 101, the data storage subsystem 100 stores a list of addresses which point to Virtual Track Table Pages (VTT Pages), each page containing a predetermined number (for example: 8192) of byte segments of memory. The physical storage for these Virtual Track Table Pages may be within cache memory 102, within controller 104, within data storage devices 105, or a combination of these locations as a matter of engineering choice.

These Virtual Track Table Pages each contain an entry for each virtual track within a 128 cylinder boundary of the virtual device. The number of Virtual Track Table Pages per virtual device is dependent on the maximum number of virtual cylinders that are defined in the virtual device's configuration. Also contained within each Virtual Track Table Page is data which defines the Logical Address of a copy of the Virtual Track Table Page comprising a Virtual Track Table Page Instance which has been written on backend data storage devices 105 during the snapshot copy operation. This Logical Address identifies the physical storage location in the backend data storage devices 105 that contains the most recently written instance of the present Virtual Track Table Page.

Each of the Virtual Track Table Pages comprise a plurality of table entries, which are indexed by virtual cylinder number and virtual track number within the virtual device (for example: Cyl 0, Trk 0). The table entries comprise a series of flags and a Track Number comprising a data entry of predetermined size, which contains the data required to access a corresponding entry contained in the Track Number Table. In the example provided herein, the Track Number comprises a 30 bit entity which contains three segments: Track Number Partition, Track Number Segment Index, Track Number Suffix. The Track Number Partition selects a list of Track Number Table Page addresses and occupies 10 bits. The Track Number Segment Index is 10 bits in size and is the index into the list of Track Number Table Page addresses for this track partition number. The Track Number Suffix is 10 bits in size and comprises the index within the Track Number Table Page. The Track Number therefore comprises a unique identifier which points to a single entry in the Track Number Table, which contains data that is used to identify the physical storage location in the backend data storage devices 105 that contains the received virtual track instance.

Track Number Table

FIG. 2 also illustrates, in block diagram form, the implementation of a Track Number Table in the present data file storage management system for snapshot copy operations 106. Conceptually, the Track Number Table is a linear table that maps each Track Number representing a virtual track instance to a logical address which identifies the physical storage location holding the virtual track instance on the backend data storage devices 105. In practice, the Track Number Table is organized much like the Virtual Track Table, with portions of the table segmented into the Track Number Table Pages. The Track Number Table is initially indexed with the Track Number Partition which selects a list of Track Number Table Page addresses. The Track Number Segment Index then selects the appropriate Track Number Table Page address from the list of Track Number Table Page addresses. A Track Number Table Page address points to a Track Number Table Page which contains a predetermined number (for example: 8192) of byte segments of memory. These Track Number Table Pages each contain an entry for each virtual track within a 1024 Track Number boundary. As with the Virtual Track Table, the physical storage for these Virtual Track Table may be within cache memory 102, within controller 104, within data storage devices 105, or a combination of these locations as a matter of engineering choice.

The particular implementation of the two level mapping table disclosed herein represents one implementation and other variations of this scheme can be used for the same purpose. What is of note herein is that the Track Number represents an immutable name for the virtual track instance, such that the Virtual Track Table can be manipulated by the present data file storage management system for snapshot copy operations 106 to perform the snapshot copy function without regard for the logical address of the virtual track instance. The logical address of the virtual track instance is managed such that any change in the physical storage location of the virtual track instance need be recorded only in a single location in the Track Number Table, regardless of the number of virtual track addresses associated with the virtual track instance in the Virtual Track Table.

Additional Data Structures

Figures 3, 4, 5:
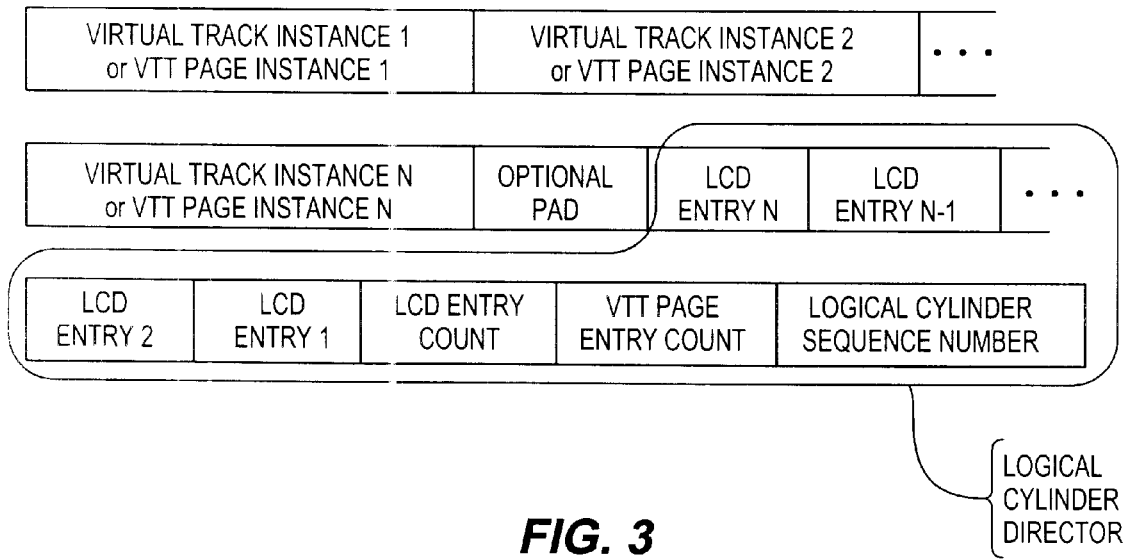
FIG. 3 illustrates in block diagram form a typical implementation of a Logical Cylinder.
FIG. 4 illustrates in block diagram form a Logical Cylinder Directory entry which describes a Virtual Track Instance.
FIG. 5 illustrates in block diagram form a Logical Cylinder Directory entry which describes a Virtual Track Table Page Instance.

Data storage subsystem 100 formats the data it stores on backend data storage devices 105 in a data structure known as a Logical Cylinder. FIG. 3 illustrates in block diagram form a typical implementation of a Logical Cylinder. The Logical Cylinder consists of a plurality of Virtual Track Instances and/or VTT Page Instances and a Logical Cylinder Directory (LCD). The Logical Cylinder Directory consists of an LCD entry for each Virtual Track Instance and/or VTT Page instance in the Logical Cylinder, a count of the total number of LCD Entries in the LCD, a count of those LCD Entries which describe VTT Page Instances and a Logical Cylinder Sequence Number (LCSN). An optional pad area may separate the Virtual Track Instances and/or VTT Page Instances from the Logical Cylinder Directory so as to ensure that the final portion of the LCD is stored at the end of the regions of the backend data storage devices 105 which together are used to hold the Logical Cylinder. The LCD summarizes the contents of the Logical Cylinder. The Logical Cylinder Sequence Number can be used to determine the order in which Logical Cylinders were written, enabling the recovery of the mapping table by repeating the sequence of mapping table updates which took place when each logical cylinder was written.

FIG. 4 depicts in block diagram form a Logical Cylinder Directory entry which describes a Virtual Track Instance. Each Logical Cylinder Directory entry contains a Logical Cylinder Directory Entry Type, which in this case identifies the entry as being one which describes a Virtual track Instance. The Virtual Track Address field within this type of Logical Cylinder Directory entry contains the Virtual Track Address which processor 101 initially assigned to the virtual track when it was most recently written or modified. If a virtual track is copied, processor 101 subsequently modifies the virtual track and then the physical position of the virtual track instance is changed by the free space collection process, a NULL value is written into the Virtual Track Address field. This NULL value indicates that even though the Virtual Track Instance still represents the current data file associated with the Track Number in the LCD entry, it no longer represents the current data file associated with the Virtual Track Address to which the data file was most recently written.

The Track Number field contains the immutable name by which this Virtual Track Instance is known. The Track Number contained in the Track Number field of this type of Logical Cylinder Directory entry is used to select the entry in the Track Number Table which contains the logical address of the Virtual Track Instance described by the Logical Cylinder Directory entry.

The Logical Address and Virtual Track Instance Length fields identify where in the Logical Cylinder the Virtual Track Instance starts and ends.

FIG. 5 depicts in block diagram form a Logical Cylinder Directory entry which describes a Virtual Track Table Page Instance. The Logical Cylinder Directory Entry Type identifies the Logical Cylinder Directory entry as being one which describes a VTT Page Instance. The VTT Page Identifier field identifies which VTT Page is contained in the Logical Cylinder. The Original LCSN field contains the LCSN of the Logical Cylinder in which this instance of the VTT Page was first written. This will differ from the LCSN of the Logical Cylinder that currently contains the VTT Page Instance when the physical location of the VTT Page Instance has been changed by the free space collection process. Preserving the LCSN of the Logical Cylinder in which the VTT Page Instance was originally written allows the recovery of the mapping table updates performed by a snapshot copy operation when the mapping table is being recovered by repeating the sequence of mapping table updates which took place when each logical cylinder was written. In the case of the mapping table updates captured in the VTT Page Instance, the time at which the mapping table recovery process reads the VTT Page Instance into the mapping table is determined by the LCSN of the logical cylinder into which the VTT Page Instance was originally written, not the LCSN of the Logical Cylinder in which the VTT Page Instance is currently stored.

Figure 6A:
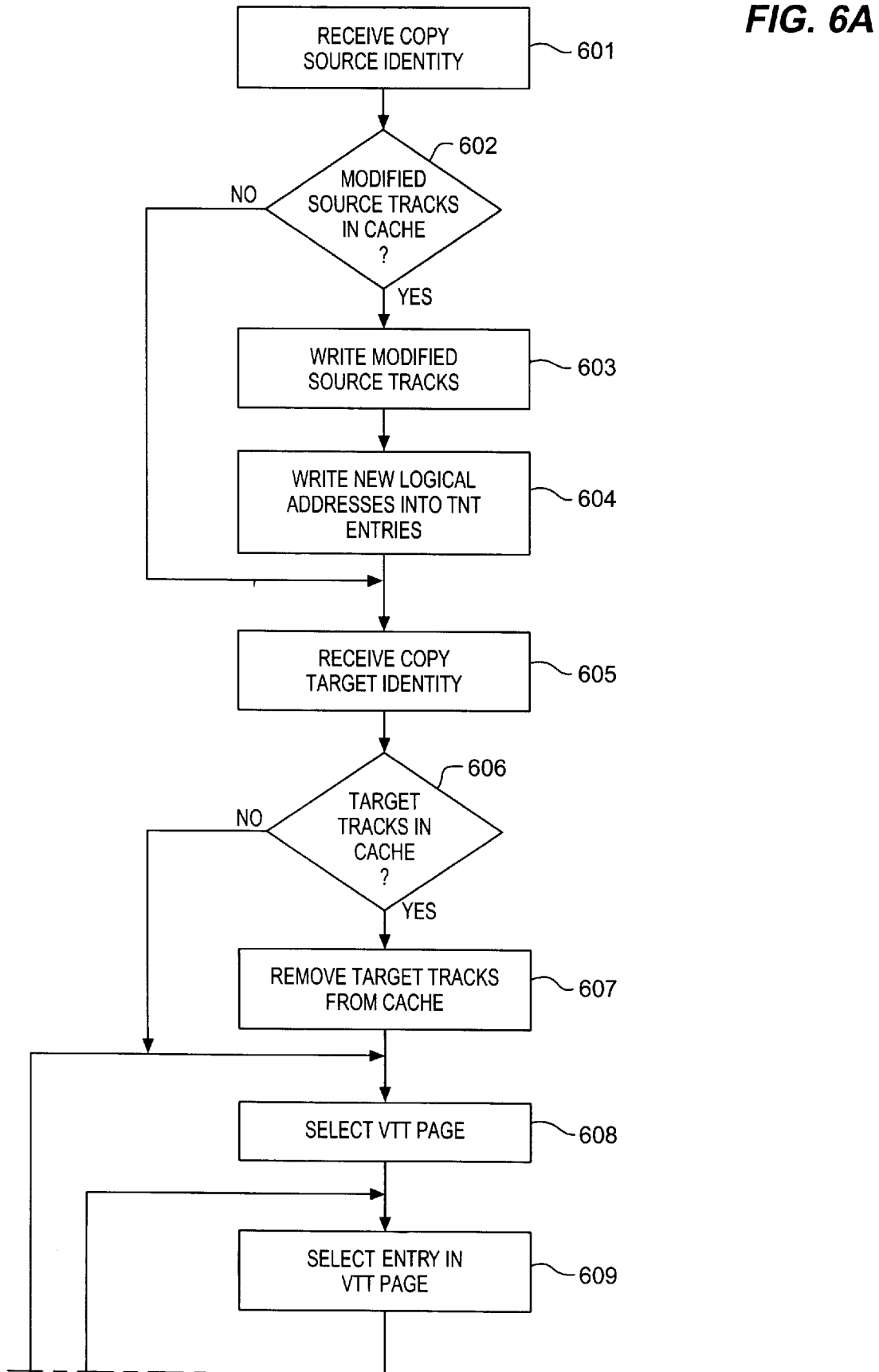
FIGS. 6A–6B illustrate in flow diagram form the operational steps taken by the controller to perform a snapshot copy process.
Figure 6B:
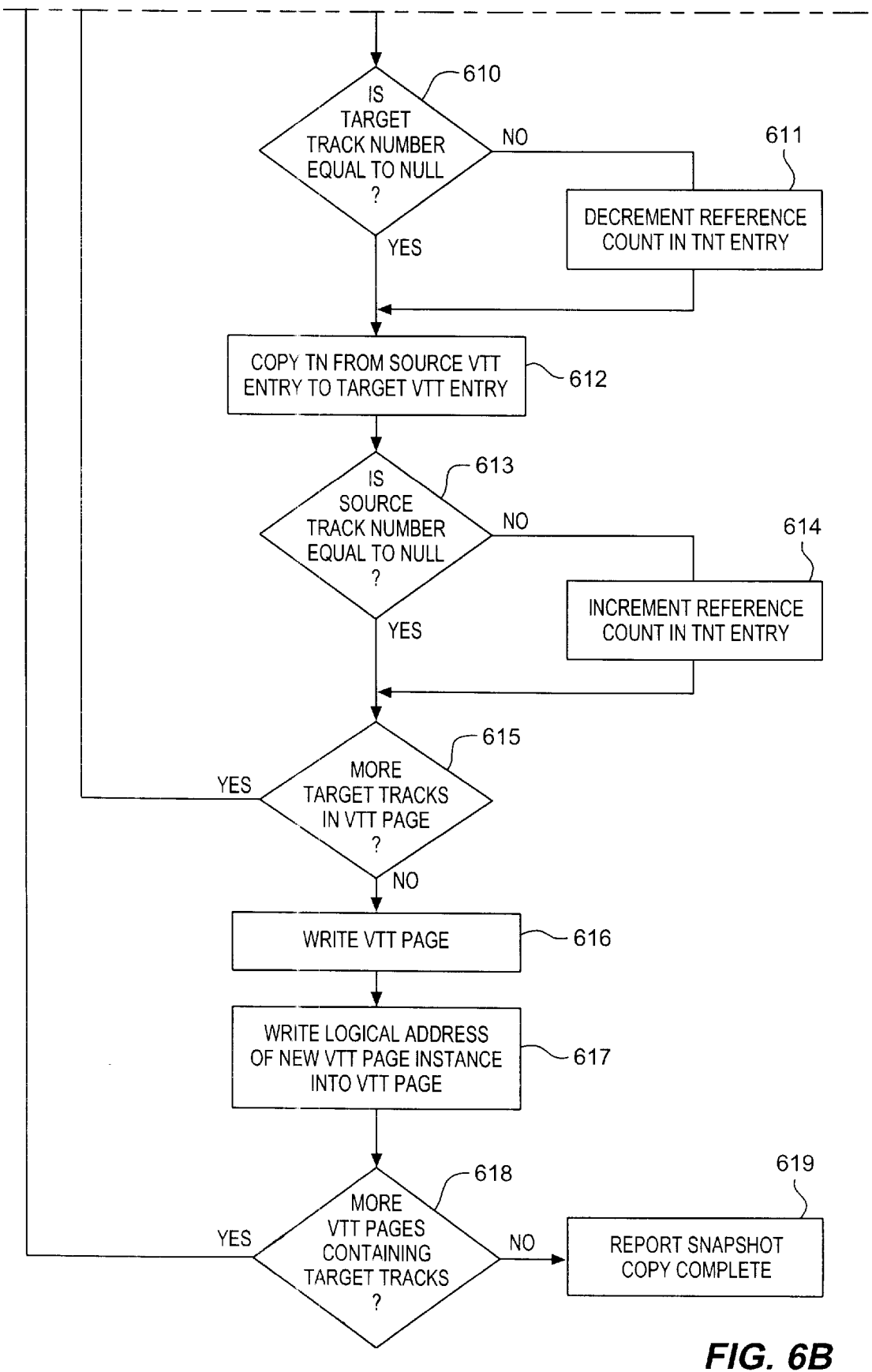

FIG. 6 illustrates in flow diagram form the operational steps taken by controller 104 to carry out snapshot copy process 107 in response to processor 101 instructing data storage subsystem 100 to copy one or more source data files for which processor 101 has assigned one or more Virtual Track Addresses (these data files constituting the source area) to an equal number of target data files which are again identified by processor 101 using one or more Virtual Track Addresses (the target area). Host processor 101 has the flexibility to specify a single source data file multiple times in its definition of the source area. In this fashion, processor 101 may employ a single snapshot copy command issued to data storage subsystem 100 to direct the snapshot copy process 107 depicted in FIG. 6 to make a plurality of copies of a source data file.

At step 601, controller 104 receives the identity of the copy source data files from processor 101. In preferred implementation, processor 104 specifies the data files to be copied by transmitting over data channel 103 the Virtual Track Addresses of the data files (also known as virtual tracks or simply tracks) to be copied. At step 602, controller 104 determines whether modified forms of any of the source tracks are stored in cache memory 102. If such modified source tracks are found in cache memory 102, processing proceeds with step 603 at which point controller 104 writes the modified source tracks to backend data storage devices 105. If processor 100 had issued a command to write data to a source track before the initiation of the snapshot copy command and this write command has not yet completed, the processor 101 initiated write to the source track is allowed to complete before the modified form of the source track is written to backend data storage devices 105. At step 604 controller 104 updates the Track Number Table (TNT) by writing into the TNT entries which describe the virtual track instances written at step 603 the logical addresses of the locations within backend data storage devices 105 at which the modified track instances were stored. At the completion of step 604 or if no modified source tracks were found in cache memory 102 at step 602, processing proceeds with step 605.

At step 605, controller 104 receives the identity of the copy target data files from processor 101. As in the case of receiving the identity of the copy source data files, processor 104 transmits over data channel 103 the Virtual Track Addresses of the copy target data files. The copy target data files are the ones to which the copy source data files will appear to have been copied as soon as the specification of the copy target data files has been received by controller 104.

At step 606, controller 104 determines whether any of the target tracks are stored in cache memory 102. If target tracks are found in cache memory 102, processing proceeds with step 607 at which point controller 104 removes the target tracks from cache memory 102. If processor 100 had issued a command to read data from a target track before the initiation of the snapshot copy command and this read command has not yet completed, the target track read command is allowed to complete before the target track being read is removed from cache memory 102. The target tracks removed from cache memory 102 represent the data files which processor 101 had written into the copy target area prior to the initiation of the snapshot copy operation. Removing these target tracks from cache memory 102 ensures that if processor 101 reads a target data file from data storage subsystem 100 after it has transmitted the definition of the target area to storage subsystem 100, processor 101 will not receive the data files which were stored in the target data area prior to the snapshot copy operation. At the completion of step 607 or if no target tracks were found in cache memory 102 at step 606, processing proceeds with step 608.

At step 608, controller 104 chooses a Virtual Track Table Page which contains one or more entries that are selected by target Virtual Track Addresses. Step 608 is the first step in a program loop consisting of steps 608 through 618. Each iteration of this program loop carries out the steps required to update a Virtual Track Table Page and store the Virtual Track Table Page on backend data storage devices 105.

At step 609, controller 104 chooses a Virtual Track Table entry within the currently selected Virtual Track Table Page which maps a target Virtual Track Address to a Track Number. Step 609 is the first step in a program loop consisting of steps 609 through 615. Each iteration of this program loop carries out the steps required to update a Virtual Track Table entry so that the Virtual Track Table entry maps a target Virtual Track Address to the same Track Number as the Track Number which represents the source data file which is being copied to the target Virtual Track Address.

At step 610, controller 104 determines whether the Track Number contained in the selected Virtual Track Table entry contains a NULL value. If no data has ever been written to the data file described by the selected Virtual Track Table entry or processor 101 has instructed data storage subsystem 100 to delete the data file described by the selected Virtual Track Table entry, the Track Number field in the Virtual Track Table entry will contain a NULL value. If the Track Number stored in the selected Virtual Track Table entry is found not to be a NULL value, processing proceeds with step 611. At step 611, controller 104 decrements the reference count in the TNT entry selected by the Track Number stored in the selected Virtual Track Table entry. This indicates that there is now one less Virtual Track Address by which the data file described by the TNT entry can be accessed. If the resulting reference count is zero, it indicates that the data file described by the TNT entry can no longer be accessed by any Virtual Track Address. In this case, the virtual track instance described by the TNT entry is no longer needed and the Track Number which selects the TNT entry is free to be used to describe some new data file to which processor 101 will assign some other Virtual Track Address. At the completion of step 611 or if the Track Number in the currently selected Virtual Track Table entry was found to be NULL at step 610, processing proceeds with step 612.

At step 612, controller 104 copies the Track Number from the Virtual Track Table entry selected by the source Virtual Track Address to the Virtual Track Table entry selected by the current target Virtual Track Address. This will cause processor 101 reads from either the source Virtual Track Address or the Target Virtual Address to read the virtual track instance described by the Track Number which was just copied.

At step 613, controller 104 determines whether the source Track Number which was just copied is a NULL value. If the source Track Number is found not to be a NULL value, processing proceeds with step 614. At step 614, controller 104 increments the reference count in the TNT entry selected by the source Track Number. This indicates that there is now one more Virtual Track Address by which the data file described by the TNT entry can be accessed. At the completion of Step 614 or if the source Track Number was found to be NULL at step 613, processing proceeds with step 615.

At step 615, controller 104 determines whether there are additional target tracks within the currently selected Virtual Track Table Page which have not yet been processed. If there is an as yet unprocessed target track which selects a Virtual Track Table entry within the current Virtual Track Table Page, processing proceeds with step 609. Otherwise, processing proceeds with step 616.

At step 616, controller 104 writes the contents of the current Virtual Track Table Page to the backend data storage devices 105. This creates a new Virtual Track Table Page Instance within a Logical Cylinder. When writing a Virtual Track Table Page Instance to a Logical Cylinder, controller 104 also writes a Virtual Track Table Page Instance Logical Cylinder Directory Entry to the Logical Cylinder Directory within the Logical Cylinder. This Logical Cylinder Directory entry describes the Virtual Track Table Page instance stored within the Logical Cylinder and contains the same Logical Cylinder Sequence Number which is contained in the Logical Cylinder Directory. The LCSN field of the Virtual Track Table Page Instance Logical Cylinder Directory Entry identifies the Logical Cylinder in which the Virtual Track Table Page instance was first written so that even if the Virtual Track Table Page instance is subsequently moved to a different logical cylinder, the mapping table can be recovered by repeating the sequence of mapping table updates which took place when each logical cylinder was written.

At step 617, controller 104 writes into the Logical Address field of the Virtual Track Table Page within the mapping table which was written at step 616 the logical address at which the Virtual Track Table Page instance was written at step 616.

At step 618, controller 104 determines whether there are additional Virtual Track Table Pages which contain entries that are selected by target tracks that have not yet been processed. If there is an additional Virtual Track Table page containing a Virtual Track Table entry which describes an as yet unprocessed target track, processing proceeds with step 608. Otherwise, processing proceeds with step 619.

At step 619, controller 104 transmits status information over data channel 103 indicative of the completion of the snapshot copy operation.

Figure 7A:
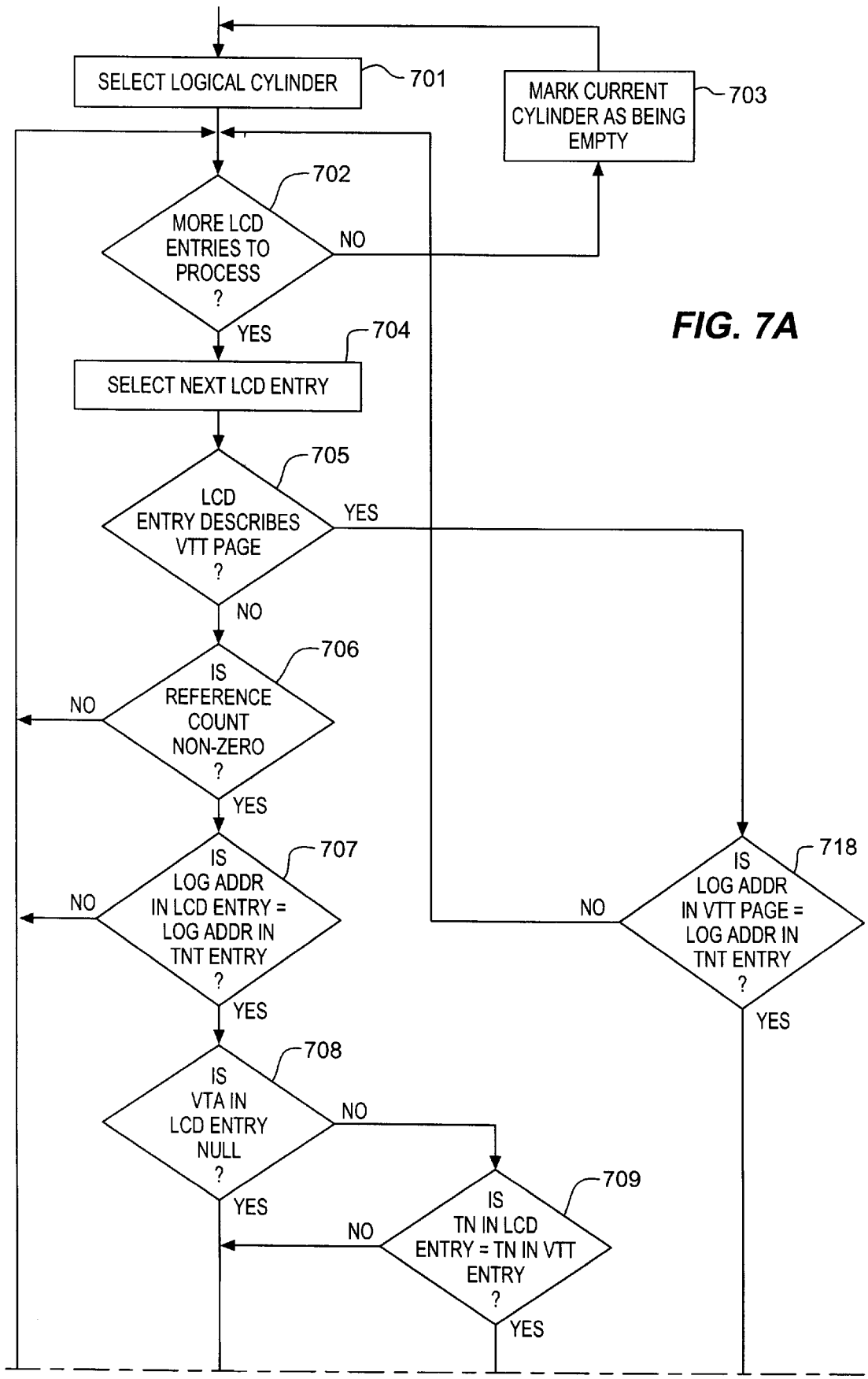
FIGS. 7A–7B illustrate in flow diagram form the operational steps taken by the controller to carry out the free space collection process.
Figure 7B:
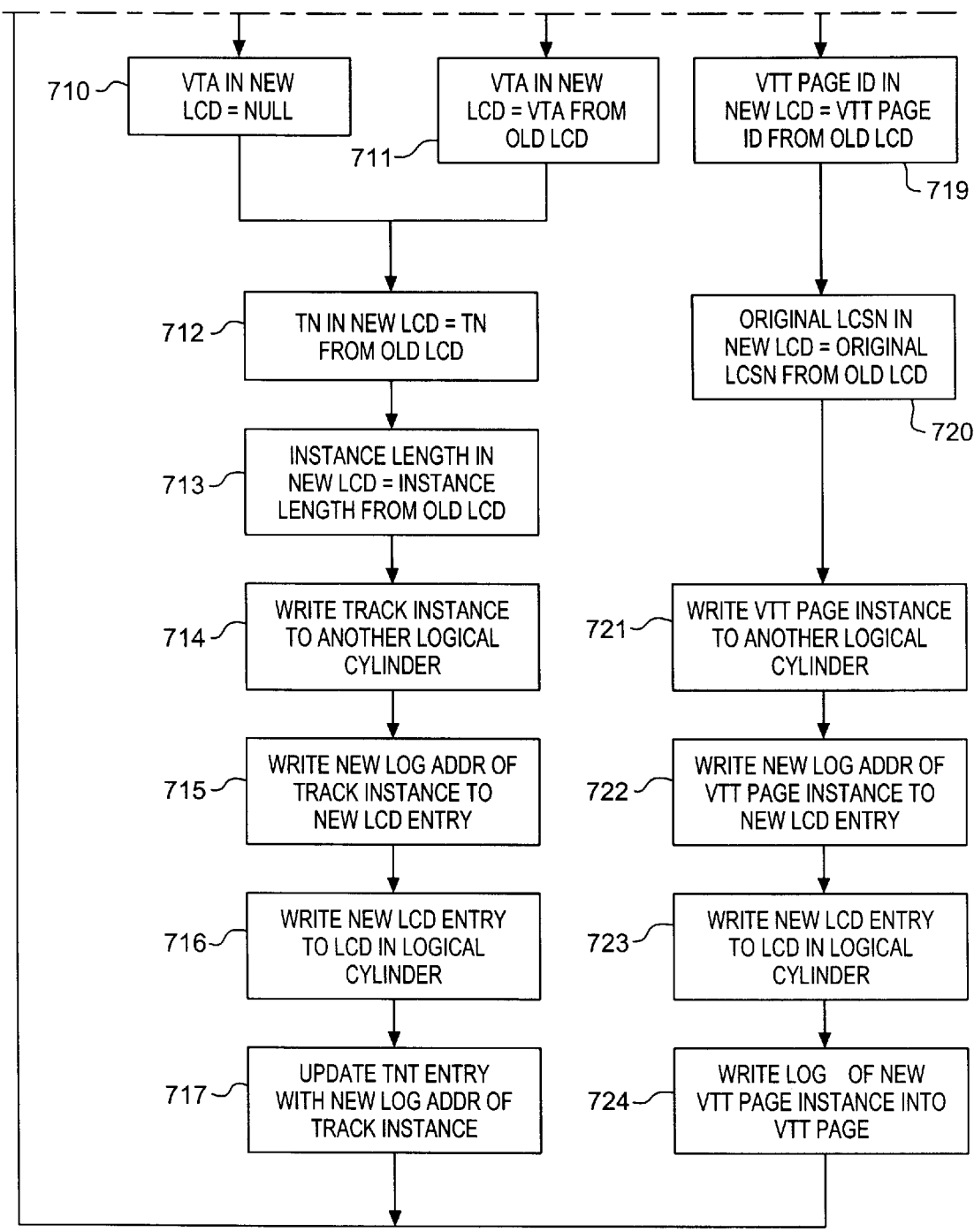
Figure 9:
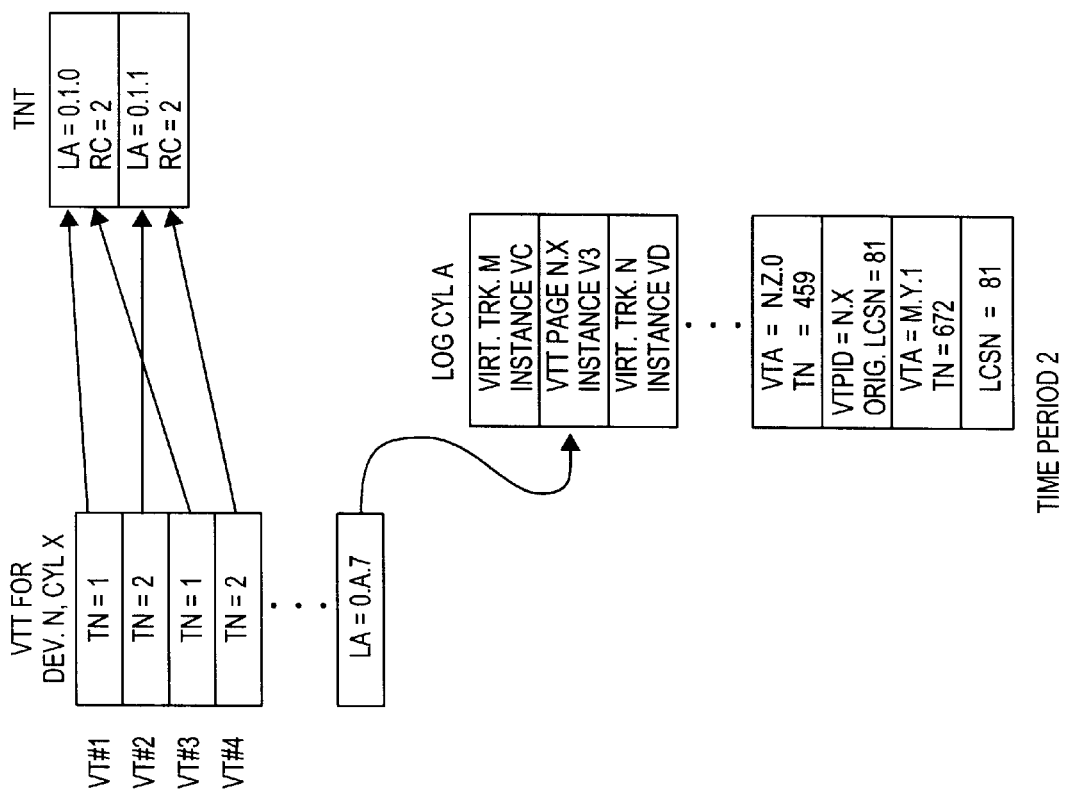

FIG. 7 illustrates in flow diagram form the operational steps taken by controller 104 to carry out the free space collection process which is a part of data file management system for snapshot copy operations 106. The free space collection process moves virtual track instances and Virtual Track Table Page instances from one logical cylinder to another in order to create completely empty logical cylinders into which new virtual track instances and Virtual Track Table Page instances can be written. When the free space collection process encounters a virtual track instance or a Virtual Track Table Page instance, it determines whether controller 104 has written an updated virtual track instance or an updated Virtual Track Table Page instance to some other physical location on backend data storage devices 105. When a more recent instance exists on backend data storage devices 105, the free space collection process does not copy the now obsolete instance to a different logical cylinder. In this way, the free space collection process discards virtual track instances which are now obsolete because processor 101 has updated the data file contained within the virtual track instance and controller 104 has written this updated data file to a different location in backend data storage devices 105. Similarly, the free space collection process discards Virtual Track Table Page instances which are now obsolete because a later snapshot copy operation has caused a more recent instance of the Virtual Track Table Page to be written to a different location in backend data storage devices 105. Thus, it is the free space collection process which limits the amount of memory contained in backend data storage devices 105 which is consumed holding the record of snapshot copy operations. This record of snapshot copy operations may be used by controller 104 to allow it to recover the mapping table. The free space collection process discards obsolete Virtual Track Table page instances, resulting in there being no need to store more Virtual Track Table page instances on backend data storage devices 105 than the number of Virtual Track Table Pages within the mapping table. Without some process for discarding the record of an old snapshot copy operation, an unbounded amount of memory within backend data storage devices 105 would be consumed as processor 101 issues an unlimited number of snapshot copy commands.

At step 701, controller 104 selects a logical cylinder which will have its contents moved to a different logical cylinder so that the selected logical cylinder will be made empty and available for holding new virtual track instances and Virtual Track Table Page instances.

At step 702, controller 104 determines whether there is another Logical Cylinder Directory entry in the Logical Cylinder Directory for the selected logical cylinder which has not yet been processed. Step 702 is the first step in a program loop consisting of steps 702 through 724. Each iteration of this program loop carries out the steps required to determine whether the virtual track instance or the Virtual Track Table Page instance described by the currently selected Logical Cylinder Directory entry should be moved to another logical cylinder. If the instance should be moved to another logical cylinder, the steps within this program loop write the instance to the other logical cylinder, creating a Logical Cylinder Directory entry which will be written to the other logical cylinder. If, at step 702, controller 104 determines that there are no more Logical Cylinder Directory entries in this logical cylinder which have yet to be processed, processing proceeds with step 703. Step 703 marks the currently selected logical cylinder as being empty so that the memory area within data storage devices 105 which holds the logical cylinder is available for being used to store new virtual track instances and new Virtual Track Table Page instances. When step 703 completes, processing proceeds with step 701.

If controller 104 determines at step 702 that there is an additional Logical Cylinder Directory entry within this logical cylinder which is yet to be processed, processing proceeds with step 704. At step 704, controller 104 selects the next Logical Cylinder Directory entry to be processed. Then at step 705, controller 104 examines the Logical Cylinder Directory Entry Type field of the Logical Cylinder Directory entry to determine whether the Logical Cylinder Directory entry describes a virtual track instance or a Virtual Track Table Page instance. If the Logical Cylinder Directory entry describes a virtual track instance, processing proceeds with step 706.

At step 706, controller 104 determines whether the reference count field of the TNT entry selected by the Track Number in the Logical Cylinder Directory entry is non-zero. If the reference count field contains the value zero, the virtual track instance described by this Logical Cylinder Directory entry is no longer needed because processor 101 has instructed data storage subsystem 100 to delete the data file contained in the virtual track instance selected by the Track Number in the current Logical Cylinder Directory entry. In this case, there is no need to preserve the virtual track instance described by the current Logical Cylinder Directory entry by writing the virtual track instance to another logical cylinder so processing proceeds with step 702. If controller 104 determines at step 706 that the reference count field of the TNT entry selected by the Track Number in the Logical Cylinder Directory entry in non-zero, processing proceeds with step 707.

At step 707, controller 104 determines whether the logical address contained in the TNT entry selected by the Track Number in the current Logical Cylinder Directory entry is equal to the logical address of virtual track instance described by the current Logical Cylinder Directory entry. If the two logical addresses are not equal, the virtual track instance described by the current Logical Cylinder Directory entry is obsolete because a more recent instance of this virtual track is stored at a different logical address than the virtual track instance described by this Logical Cylinder Directory entry. In this case, there is no need to preserve the virtual track instance described by the current Logical Cylinder Directory entry by writing the virtual track instance to another logical cylinder so processing proceeds with step 702. If controller 104 determines at step 707 that the two logical addresses are equal, the virtual track instance described by the current Logical Cylinder Directory entry is the most recent instance of this virtual track that is stored within backend data storage devices 105 and processing proceeds with step 708.

At step 708, controller 104 determines whether the Virtual Track Address field in the current Logical Cylinder Directory entry contains a NULL value. If the Virtual Track Address field does not contain a NULL value, processing proceeds with step 709 where controller 104 determines whether or not the Track Number in the Virtual Track Table entry selected by the Virtual Track Address field of the current Logical Cylinder Directory entry is equal to the Track Number contained in the current Logical Cylinder Directory entry. If the two track numbers are not equal, processor 101 has updated the data file stored within the virtual track instance but because the data file had been copied to another Virtual Track Address, a new Track Number was assigned to represent the modified data file. In this case, the virtual track instance described by the current Logical Cylinder Directory entry can no longer be accessed using the Virtual Track Address at which it was originally written by processor 101 and processing proceeds with step 710. Also, if controller 104 determines at step 708 that the Virtual Track Address in the current Logical Cylinder Directory entry already contains a NULL value, processing proceeds with step 710.

At step 710, controller 104 writes a NULL value into the Virtual Track Address field of the new Logical Cylinder Directory entry which will describe the current virtual track instance when it is written to another logical cylinder.

If controller 104 determines at step 709 that the Virtual Track Address in the current Logical Cylinder Directory entry is mapped to the same Track Number as is stored in the Track Number field of the current Logical Cylinder Directory entry. processing proceeds with step 711. At step 711, controller 104 copies the Virtual Track Address stored in the current Logical Cylinder Directory entry into the new Logical Cylinder Directory entry.

After the completion of either step 710 or step 711, processing proceeds with step 712. At step 712, controller 104 copies the Track Number from the current Logical Cylinder Directory entry to the new Logical Cylinder Directory entry. Then, at step 713, controller 104 copies the virtual track instance length from the current Logical Cylinder Directory entry to the new Logical Cylinder Directory entry.

At step 714, controller 104 writes to another logical cylinder within backend data storage devices 105 the virtual track instance described by the current Logical Cylinder Directory entry. At step 715, controller 104 writes into the Logical Address field of the new Logical Cylinder Directory entry the logical address at which the virtual track instance was written at step 714. At step 716, controller 104 writes the new Logical Cylinder Directory entry into the Logical Cylinder Directory contained in the logical cylinder to which the virtual track instance was written at step 714.

At step 717, controller 104 writes into the TNT entry selected by the Track Number contained in the current Logical Cylinder Directory entry the logical address at which the virtual track instance was written at step 714. This completes the process of moving the virtual track instance described by the current Logical Cylinder Directory entry to another logical cylinder. After the completion of step 717, processing proceeds with step 702.

If controller 104 determines at step 705 that the current Logical Cylinder Directory entry describes a Virtual Track Table Page instance processing proceeds with step 718.

At step 718, controller 104 uses the Virtual Track Table Page Identifier in the current Logical Cylinder Directory entry to select a Virtual Track Table Page within the mapping table. Controller 104 then reads the Logical Address field from this Virtual Track Table page within the mapping table and compares this logical address to the logical address of the Virtual Track Table Page instance described by the current Logical Cylinder Directory entry. If the two logical addresses are not equal, the Virtual Track Table Page instance described by the current Logical Cylinder Directory entry is obsolete because a later snapshot copy operation caused a more recent instance of this Virtual Track Table Page to be stored at a different logical address than the Virtual Track Table Page instance described by this Logical Cylinder Directory entry. In this case, there is no need to preserve the Virtual Track Table Page instance described by the current Logical Cylinder Directory entry by writing the Virtual Track Table Page instance to another logical cylinder so processing proceeds with step 702. If controller 104 determines at step 718 that the two logical addresses are equal, the Virtual Track Table Page instance described by the current Logical Cylinder Directory entry is the most recent instance of this Virtual Track Table Page that is stored within backend data storage devices 105 and processing proceeds with step 719.

At step 719, controller 104 copies the Virtual Track Table Page Identifier stored in the current Logical Cylinder Directory entry into the new Logical Cylinder Directory entry which will describe the current Virtual Track Table Page instance when it is written to another logical cylinder.

At step 720, controller 104 copies the contents of the Original LCSN field from the current Logical Cylinder Directory entry to the new Logical Cylinder Directory entry.

At step 721, controller 104 writes to another logical cylinder within backend data storage devices 105 the Virtual Track Table Page instance described by the current Logical Cylinder Directory entry. At step 722, controller 104 writes into the Logical Address field of the new Logical Cylinder Directory entry the logical address at which the Virtual Track Table Page instance was written at step 721. At step 723, controller 104 writes the new Logical Cylinder Directory entry into the Logical Cylinder Directory contained in the logical cylinder to which the Virtual Track Table Page instance was written at step 721.

At step 724, controller 104 writes into the Logical Address field of the Virtual Track Table Page within the mapping table selected by the Virtual Track Table Page Identifier field of the current Logical Cylinder Directory entry the logical address at which the Virtual Track Table Page instance was written at step 721. This completes the process of moving the Virtual Track Table Page instance described by the current Logical Cylinder Directory entry to another logical cylinder. After the completion of step 724, processing proceeds with step 702.

The free space collection process is an ongoing process within data file management system for snapshot copy operations 106. The free space collection process will pause at step 701 if there are no logical cylinders which contain obsolete virtual track instances or obsolete Virtual Track Table Page instances or if the free space collection process determines that data storage subsystem 100 would not benefit from the immediate collection of the free space from an additional logical cylinder. The details of this aspect of the behavior of the free space collection process are not relevant to the understanding of the present invention.

Virtual Track Management Example

Figure 16A:
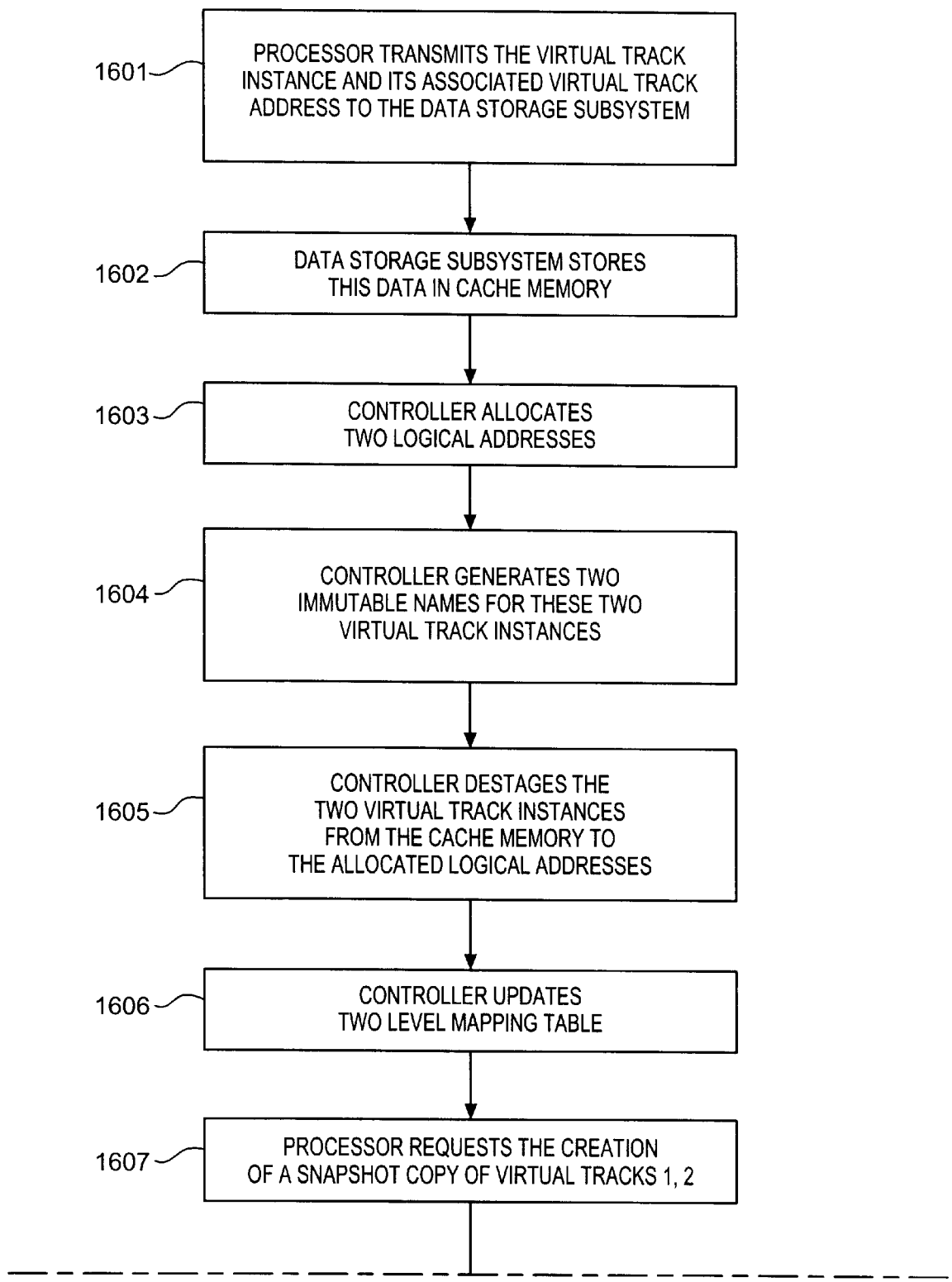
FIGS. 16A–16C illustrate in flow diagram form the operational steps taken by the present data file storage management system for snapshot copy operations to store a received data file and create copies thereof.
Figure 16B:
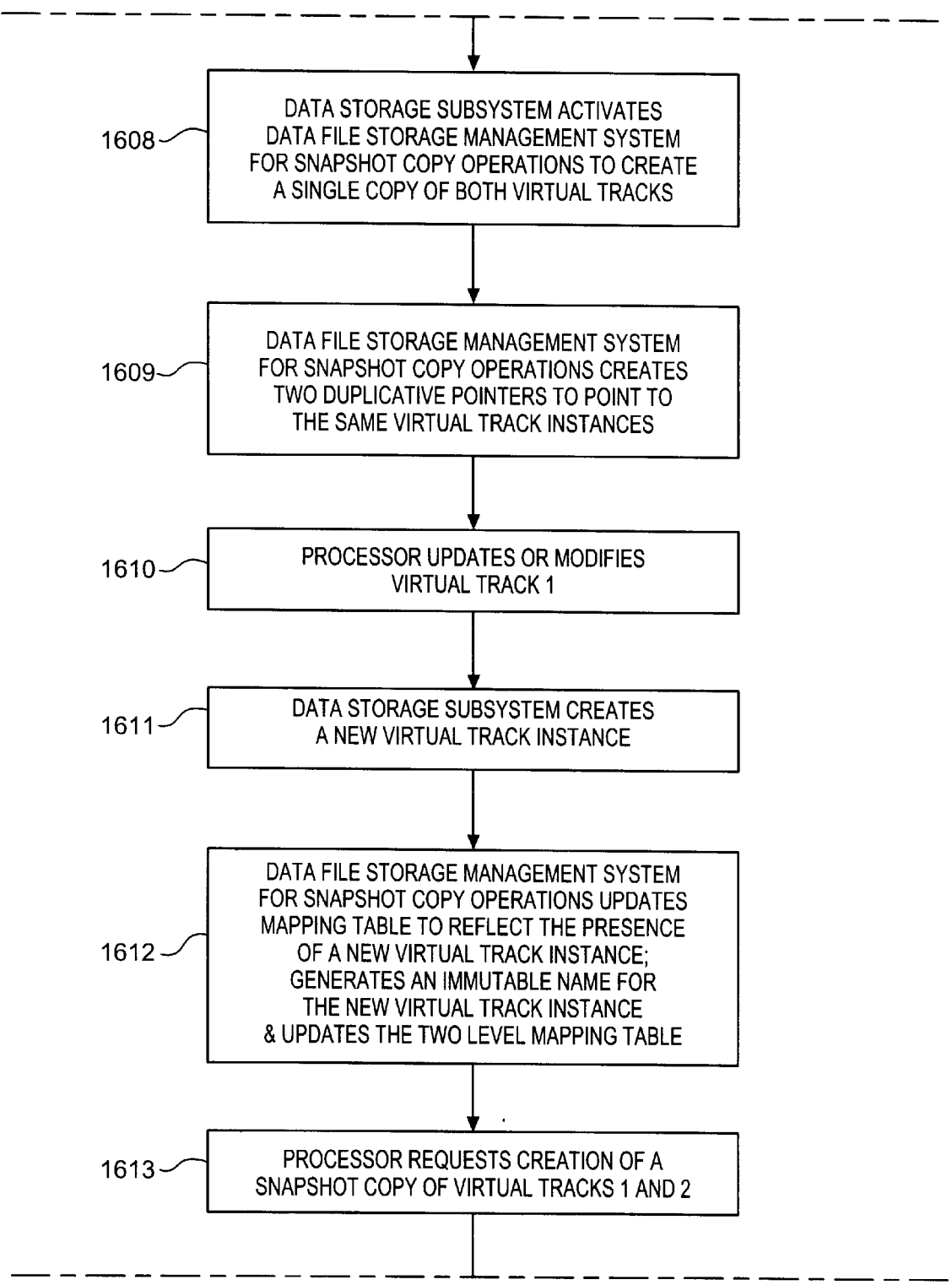
Figure 16C:
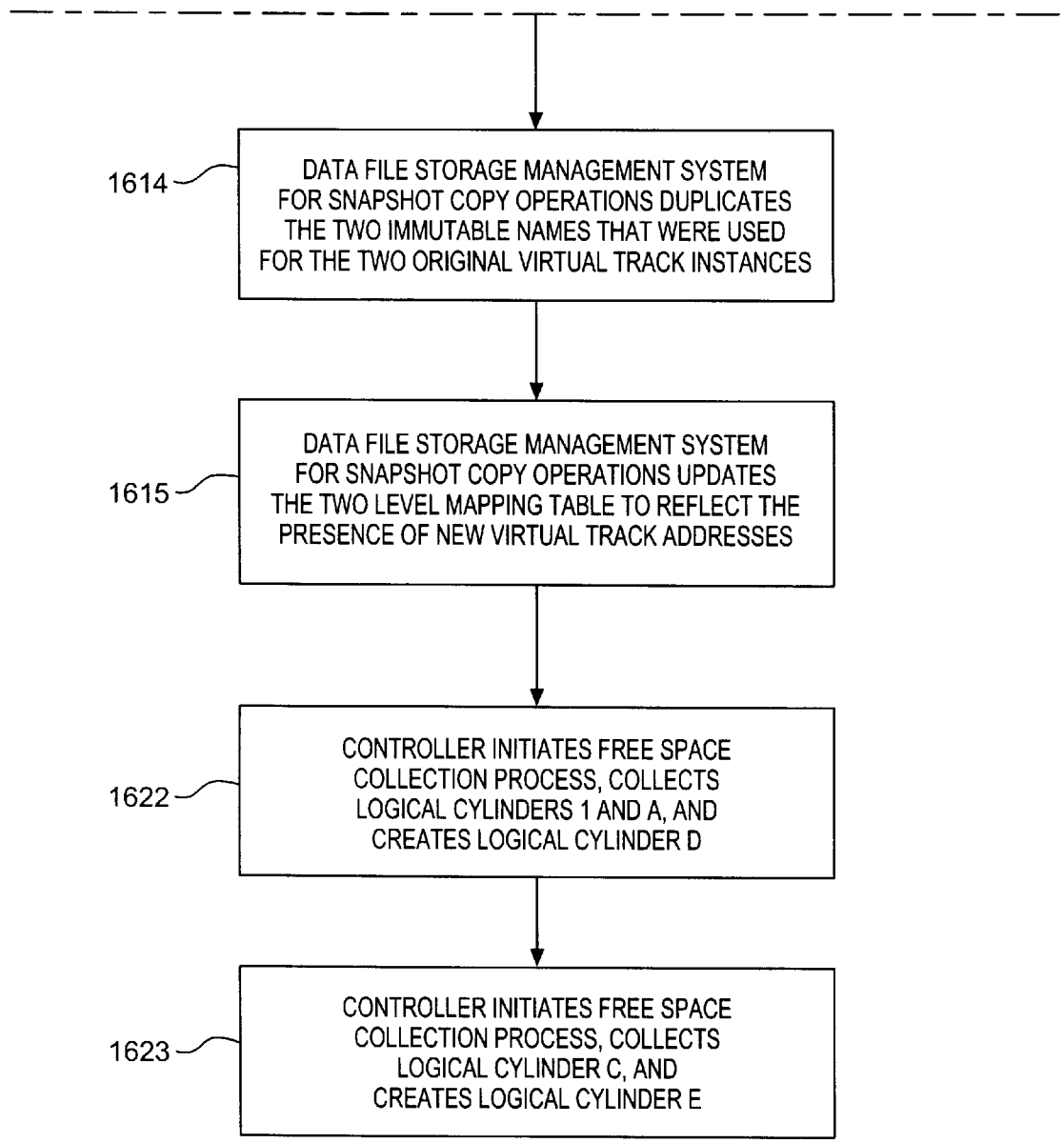

FIGS. 8–13 illustrate, in block diagram form, the state of the mapping table and particular logical cylinders at various stages of a snapshot copy operation, which is also illustrated in flow diagram form in FIGS. 16A–16C. This represents a chronological view of a set of virtual tracks and their associated data structures from their conception through a number of typical snapshot copy and data storage subsystem 100 operations. For the purposes of simplicity of description, the representation for the various entries in the two level mapping table and the logical cylinders are simplified to thereby illustrate the concepts of the present system and avoid the complexity of the implementation details.

Figure 8:
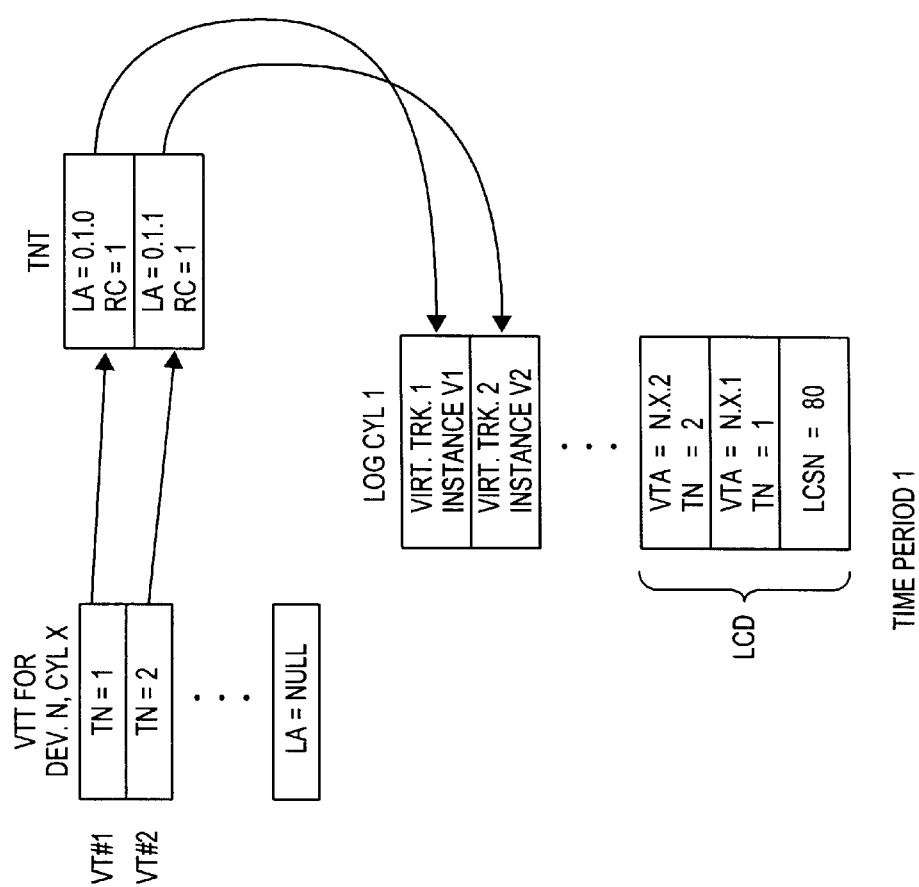
Figure 13:
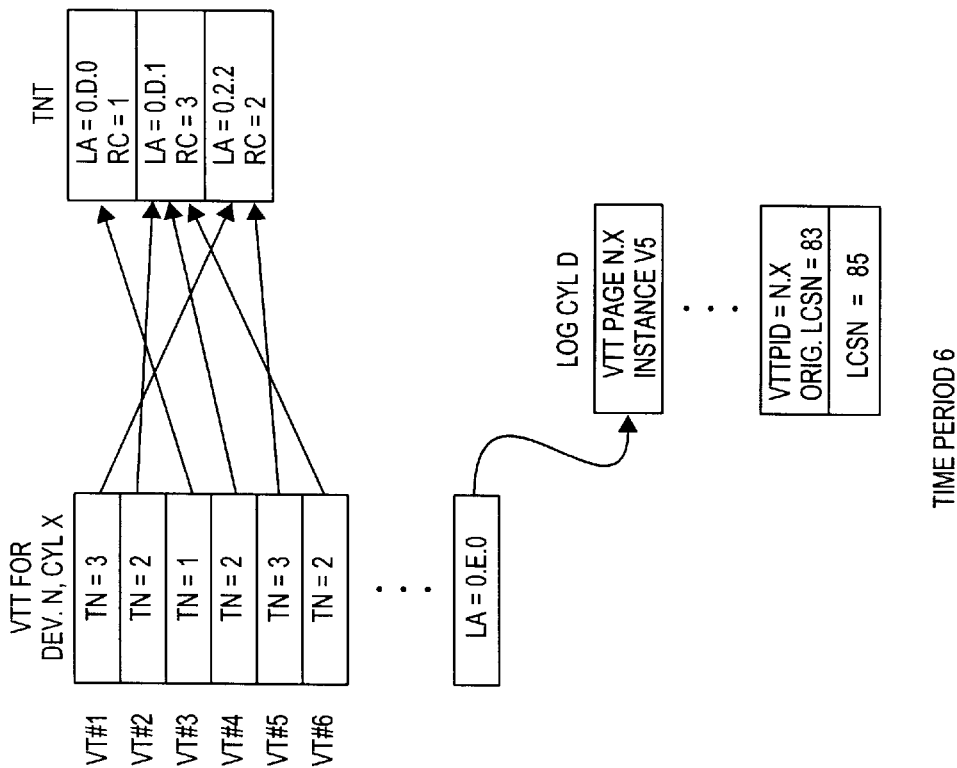

The virtual track is created within the processor 101 as part of the processor 101's data management function. The processor 101 is connected to and views the dynamically mapped virtual data storage subsystem 100 as a particular size and architecture data storage device. Therefore, when the processor 101 wishes to store a virtual track instance on the "data storage device" embodied by the data storage subsystem 100, the processor 101 formats the virtual track instance and assigns it a particular virtual track address. The processor 101 then transmits the virtual track instance and its associated virtual track address to the data storage subsystem 100 at step 1601 over a selected one of the data channels 103. In the present example, it is assumed that the processor 101 creates two virtual track instances for storage on the data storage subsystem 100. The data storage subsystem 100, upon receipt of these two virtual track instances at step 1602, stores this data in cache memory 102 and the controller 104 allocates two logical addresses which identify two physical data storage locations on the backend data storage devices 105 for the storage of the two received virtual track instances at step 1603. The controller 104 also generates two immutable names for these two virtual track instances at step 1604, with the immutable names comprising Track Numbers as described above. The controller 104 then writes the two virtual track instances from the cache memory 102 to the allocated logical addresses where the data is stored at step 1605. The controller 104 at step 1605 then updates the two level mapping table to reflect the presence of these two virtual track instances on the backend data storage devices 105. The mapping table entries comprise two entries in the Virtual Track Table VTT for Device N, Cylinder X, with the first entry VT#1 having an entry of TN=1 and the second entry VT#2 having an entry TN=2. These Track Numbers (TN=1, TN=2) are shortened versions of the actual numbers but serve to illustrate the operation of the mapping table. The Track Numbers point to corresponding entries in the Track Number Table TNT, wherein data indicative of the logical address and reference count for the two virtual track instances are stored. The logical address data for the first and second virtual track instances are LA=0.1.0 and LA=0.1.1, respectively, indicative of the physical storage locations of logical device 0, logical cylinder 1, sectors 0, 1, respectively. Since these two virtual track instances are newly crated and no other virtual track addresses point to them, the reference counts RC are set to 1 to indicate that a single virtual track address points to the respective virtual track instances. Thus, as shown in FIG. 8, at the end of time period 1, the processor 101 has created two virtual tracks, virtual track 1 and virtual track 2, both of which are stored in the allocated logical addresses comprising logical cylinder 1 of logical device 0, sectors 0 and 1. The Logical Cylinder Directory LCD for logical cylinder 1 contains data entries that identify the existence of virtual tracks 1, 2. The logical address entry in the Virtual Track Table Page contains a NULL value, since no snapshot copies have been made involving virtual tracks in the page.

At step 1607, the processor 101 requests the creation of a snapshot copy of virtual tracks 1, 2 and has assigned Virtual Track Addresses of N.X.3 and N.X.4 respectively to these two copies of the original virtual track instances. The Virtual Track addresses N.X.3 and N.X.4 are indicative of virtual device N, cylinder X. tracks 3, 4, respectively. In response to receipt of commands from the processor 101 received over a selected data channel 103, of step 1608 the data storage subsystem 100 activates the data file storage management system for snapshot copy operations 106 to create a single copy of both virtual tracks. This is accomplished at step 1609 by simply creating two duplicative pointers to point to the same virtual track instances. The Virtual Track Table entries VT#1, VT#2 are copied to Virtual Track Table entries VT#3, VT#4, on the same virtual cylinder, respectively. At the end of time period 2, the reference counts RC in the Track Number Table have been incremented to 2, to indicate that there are two Virtual Track Table entries VT#1, VT#3, and VT#2, VT#4 pointing to the virtual track instances V1, V2 respectively, stored in the physical memory. These two virtual track instances are identified as V1, V2 only for the purposes of this illustration to allow later instances of the same virtual tracks to be identified uniquely. In its operation, data file storage management system for snapshot copy operations 106 does not utilize or store names such as V1, V2 to uniquely identify particular virtual track instances. Instead, the particular virtual track instance which represents the data most recently written to a Virtual Track Address is identified by the Track Number which points to the virtual track instance. The data for mapping a Virtual Track Address to a Track Number is stored in the Virtual Track Table entries VT#3, VT#4, with the entries stored therein comprising the Track Numbers TN=1, TN=2 as with the entries for the original Virtual Track Addresses, since the virtual tracks are unmodified. A Virtual Track Table Page Logical Cylinder Directory entry is made in the Logical Cylinder Directory. This entry in the Logical Cylinder Directory contains the identity of the Virtual Track Table Page and the Logical Cylinder Sequence Number assigned to the current instance of logical cylinder A. Also, the Virtual Track Table Page that contains the virtual tracks that were affected by the snapshot copy operation is written to the logical cylinder in the same manner as virtual track instances. The backup of the Virtual Track Table Page contained within logical cylinder A allows a mapping table recovery process to reconstruct the mapping tables without requiring that either the copied virtual track instances be rewritten or the complete history of all copy operations be maintained on backend data storage devices 105. The backup of an entire page is a fundamental concept in the two level mapping table design in that it simplifies the free space collection process by maintaining the snapshot copy history in Virtual Track Table Page size units rather than virtual track size units. Therefore, only the most recent version of that page needs to be maintained on the backend data storage devices 105 even though multiple copies within that page may have occurred.

At step 1610, the processor 101 updates or modified virtual track 1 in cylinder X of device N and the modified version of virtual track 1 must now be embodied in a physical virtual track instance which differs from the original virtual track instance of virtual track 1 to reflect these changes. The data storage subsystem 100 creates a new virtual track instance at step 1611 by applying the modifications received from processor 101 to a physical copy of the original virtual track instance V1, resulting in a new virtual track instance which, for purposes for illustrating this example, is identified in FIG. 10 as virtual track instance V4. The data storage subsystem 100 writes the modified version of virtual track instance V1, as virtual track instance V4, onto the backend data storage device location logical device 0, cylinder 2, sector 2 (LA=0.2.2) and must update the mapping table to reflect the presence of a new virtual track instance at step 1612. In particular, the data file storage management system for snapshot copy operations 105 generates an immutable name for the new virtual track instance with the immutable name comprising a Track Number as described above. The data file storage management system for snapshot copy operations 106 then updates the two level mapping table to reflect the presence of this new virtual track instance on the backend data storage devices 105. The mapping table entries comprise an entry in the Virtual Track Table for virtual device N, cylinder X, with the first entry VT#1 being converted to an entry of TN=3 to reflect the fact that the current virtual track instance selected by this Virtual Track Address is a modified version of the original virtual track instance but the original virtual track instance must be preserved because it can be accessed by a different Virtual Track Address. Virtual track instance V1 no longer represents the contents of virtual track 1 with the original data at sector 0 now being pointed to only by the Track Number Table entry that is pointed to by the Virtual Track Table entry for virtual track 3. At the end of time period 3, the reference count in the Track Number Table entry has been decremented and a new entry (3) has been added to the Track Number Table. The Logical Cylinder Directory for logical cylinder 2 contains a normal virtual track entry for the updated virtual track.

At step 1613, the processor 101 requests the creation of a snapshot copy, with virtual tracks 1 and 2 being copied to virtual tracks 5 and 6 respectively, of the same cylinder. The controller 104 responds to receipt of this snapshot copy request by creating two new entries in the mapping table to reflect the snapshot copy of two virtual tracks. In particular, the data file storage management system for snapshot copy operations 106 duplicates the two immutable names that were used for the two original virtual track instances at step

1614, with the immutable names comprising the two originally created Track Numbers TN=2 and TN=3 as described above. The data file management system for snapshot copy 106 then updates the two level mapping table to reflect the association of these new virtual track addresses with the already existing virtual track instances at step 1616. The mapping table entries comprise two entries in the Virtual Track Table for device N, cylinder X, with the first entry VT#5 being populated with an entry of TN=3 to reflect the fact that the data stored at this virtual track address is the data which resulted from the modifications written to virtual track 1 at step 1610 above and the second entry, VT#6 being populated with an entry of TN=2 to reflect the fact that this virtual track address selects the virtual track instance which was originally written to virtual track 2. The reference counts for the Track Number Table entries 2 and 3 have been incremented to RC=3 and RC=2 to reflect the current number of Virtual Track Table entries which now point to these Track Number Table entries and thence to the virtual track instances V4 and V2 which reside on the backend data storage devices 105. A Virtual Track Table Logical Cylinder Directory entry is made in the Logical Cylinder Directory which contains the identify of the Virtual Track Table Page and the Logical Cylinder Sequence Number assigned to the current instance of logical cylinder C. The Virtual Track Table Page that contains the virtual tracks which were affected by the snapshot copy is written to logical cylinder C. FIG. 11 illustrates the state of the mapping table at the end of time period 4 at which point the data originally written to virtual track 1 at step 1601 now exists as a single instance of data addressed only by virtual track 3 as a consequence of the first snapshot copy that was performed in this sequence and the subsequent writing or modified data to virtual track 1.

At step 1622, the controller initiates the free space collection process which collects logical cylinders 1 and A, creating logical cylinder D, which contains all of the collected area. Logical cylinder 1 contains Logical Cylinder directory entries that define the creation of virtual track instances V1 and V2 which processor 101 originally wrote to Virtual Track Addresses N.X.1 and N.X.2. Logical cylinder A contains a Logical Cylinder Directory entry which describes the Virtual Track Table Page that defines the first snapshot copy operation which was performed at step 1609. For virtual track entries, the free space collection process uses the track number that is contained within the Logical Cylinder Directory entry to index the Track Number Table to determine whether the current virtual track instance is the most recent. In this case, at the start of time period 5, the Track Number Table entries for track numbers 1 and 2 each contain a non-zero reference count and the logical addresses within each of these two entries in the Track Number Table are equal to the logical addresses of the virtual track instances V1 and V2 within logical cylinder 1. Therefore, the two virtual track instances V1 and V2 can each be accessed by one or more Virtual Track Addresses and these two virtual track instances are still the most recent instances associated with track numbers 1 and 2 respectively. The free space collection process copies the virtual track instances V1 and V2 from logical cylinder 1 to logical cylinder D so that logical cylinder 1 can be used to hold new virtual track instances and Virtual Track Table Page instances. Before writing the Logical Cylinder Directory entries describing virtual track instances V1 and V2 to the Logical Cylinder Directory within logical cylinder D, the free space collection process determines whether these virtual track instances are still selected when processor 101 accesses the Virtual Track Address at which the virtual track instances were originally written. In the case of virtual track instance V1, the free space collection process uses the Virtual Track Address X.N.1 from the Logical Cylinder Directory entry for virtual track instance V1 to index the Virtual Track Table. This Virtual Track Address selects Virtual Track Table entry VT#1 which, at step 1622 contains TN=3. The track number in Virtual Track Table entry VT#1 is no longer equal to the track number in the Virtual Track Instance Logical Cylinder Directory entry for virtual track instance V1. Therefore, the free space collection process writes a NULL value into the Virtual Track Address field of the new Logical Cylinder Directory entry for virtual track instance V1 that it writes to logical cylinder D. However, in the case of virtual track instance V2, the Virtual Track Table entry VT#2 selected by Virtual Track Address X.N.2 still contains TN=2. Therefore, the free space collection process copies the virtual track address X.N.2 from the Logical Cylinder Directory entry for virtual track instance VT2 in logical cylinder 1 into the new Logical Cylinder Directory entry for virtual track instance VT2 in logical cylinder D. The free space collection process then writes into the Track Number Table entries for Track Numbers 1, 2 the logical addresses identifying the physical locations within logical cylinder D of virtual track instances V1, V2, respectively.

Figure 12:
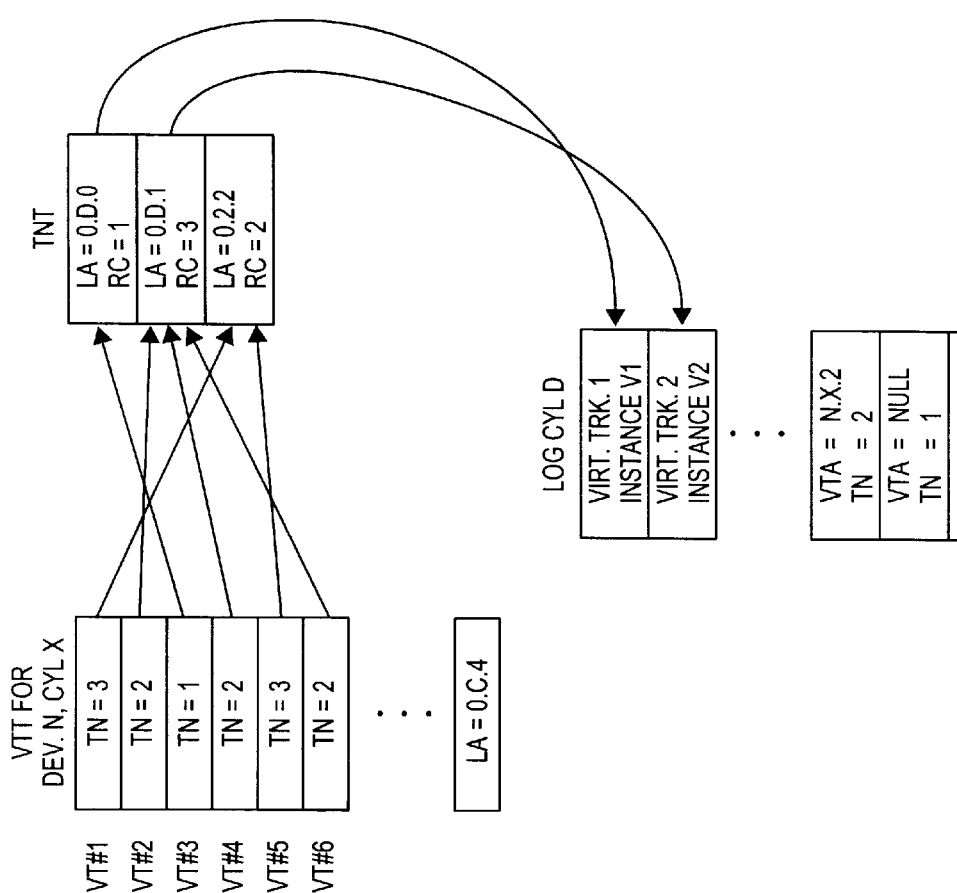

For Virtual Track Table Page Logical Cylinder Directory entries, the free space collection process uses the Virtual Track Table Page identifier contained in the entry to index into the Virtual Track Table to find the logical address of the most recent instance of the Virtual Track Table Page which was written to backend data storage devices 105. The logical address read from the selected Virtual Track Table Page is compared to the logical address of the Virtual Track Table Page instance described by the Virtual Track Table Page Logical Cylinder Directory entry. If the two logical addresses are not equal, then the Virtual Track Table Page described by the current Logical Cylinder Directory entry is not the most recent instance stored on backend data storage devices 105 and the Virtual Track Table Page instance described by the current Logical Cylinder Directory entry can be discarded. The logical address contained in the Virtual Track Table Page identifies a more recent instance of this Virtual Track Table Page which was written to backend data storage devices 105 as a consequence of a later snapshot copy operation. Thus, the free space collection process does not copy the Virtual Track Table Page instance V4 from logical cylinder C to logical cylinder D. FIG. 12 shows the contents of the mapping table and the contents of logical cylinder D at the end of time period 5.

At step 1623, the controller 104 initiates the free space collection process which collects logical cylinder C, creating logical cylinder E, which contains all of the collected data. Logical Cylinder C contains a Logical Cylinder Directory entry which describes the Virtual Track Table Page that defines the second snapshot copy operation which was performed by steps 1614 and 1615. The free space collection process uses the Virtual Track Table Page identifier contained in the Virtual Track Table Page Logical Cylinder Directory entry to index into the Virtual Track Table to find the logical address of the most recent instance of the Virtual Track Table Page which was written to backend data storage device 105. In this case, the logical address stored in the Virtual Track Table Page is equal to the logical address of the Virtual Track Table Page instance described by the Logical Cylinder Directory in logical cylinder C. This means that the Virtual Track Table Page instance is the most recent instance of this Virtual Track Table Page stored on backend data storage devices 105 so the free space collection process copies the Virtual Track Table Page instance from logical cylinder C to logical cylinder E. In the new Virtual Track Table Page Logical Cylinder Directory Entry written to logical cylinder E by the free space collection process, the Original Logical Cylinder Sequence Number field contains a copy of the Original Logical Cylinder Sequence Number field from the Logical Cylinder Directory entry from logical cylinder C. Should it become necessary to recover the mapping table using the Logical Cylinder Directory entries, the Virtual Track Table Page Logical Cylinder Directory entry will indicate that the appropriate time to apply the Virtual Track Table Page instance which the free space collection process copied to logical cylinder E is after applying the mapping table updates resulting from the writing of logical cylinders with a logical Cylinder Sequence Number less than 83 and before applying updates resulting from logical cylinders with a Logical Cylinder Sequence Number greater than 83. Now that the Virtual Track Table Page instance has been copied from logical cylinder C to logical cylinder E, the free space collection process writes the logical address of the newly written Virtual Track Table Page instance into the Virtual Track Table Page.

Maintenance of Point in Time Copy Semantics

For a snapshot copy operation to provide point in time copy semantics, the data read and write operations initiated by processors 101-1 through 101-K must behave as though the data files being copied using the snapshot copy method were copied at the instant the snapshot copy command is received by data storage subsystem 100. To provide this behavior, controller 104 within data storage subsystem 100 carries out steps to ensure that data access operations performed by any processor 101 are completed before the mapping table updates resulting from the snapshot copy operation are performed. Steps 601 through 607 in FIG. 6 ensure that all data written to the copy source area before the initiation of the copy operation will appear in the copy target area, all data written to the copy target area before the initiation of the copy will be overwritten by data from the copy source area and all data being read from the target area before the initiation of the copy operation will not reflect the results of the copy operation.

Figure 14:
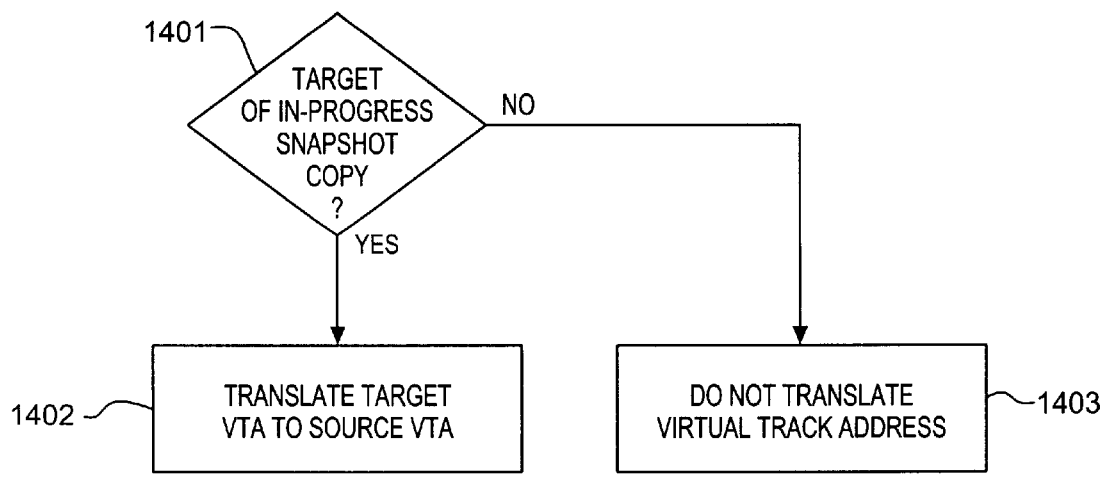
FIG. 14 illustrates in flow diagram form the operational steps taken by the controller when screening data file read requests.
Figure 15:
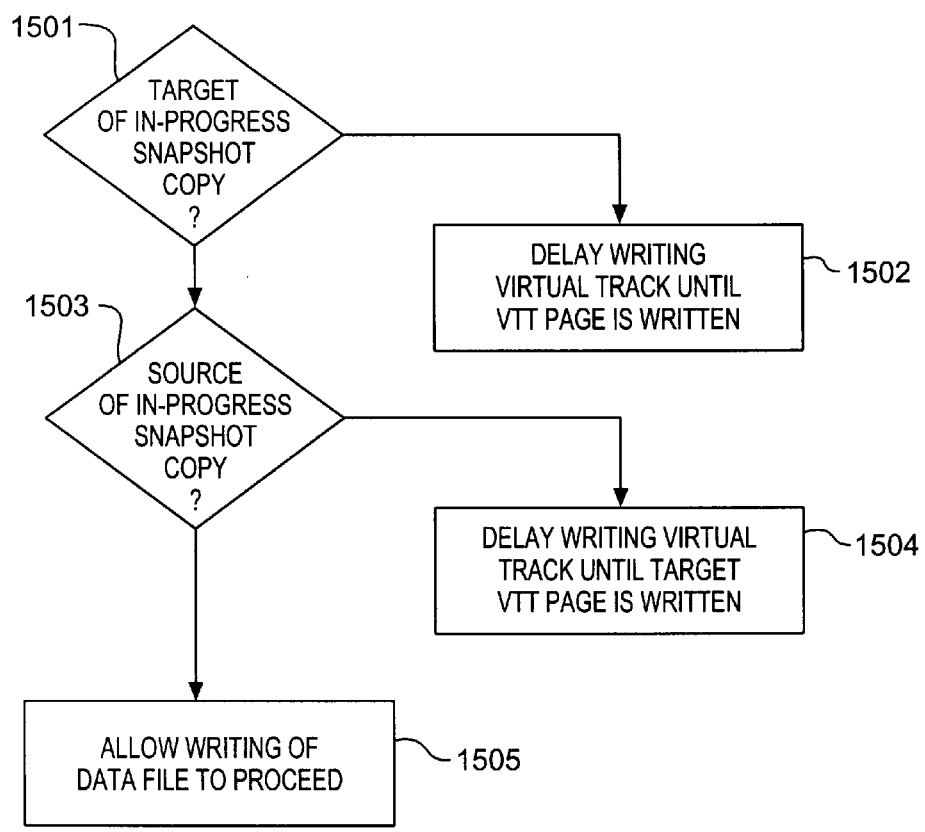
FIG. 15 illustrates in flow diagram form the operational steps taken by the controller when screening virtual track write requests.

Another aspect of maintaining point in time copy semantics is ensuring that no data written to the copy source area after the initiation of the copy will appear in the copy target area, no data written to the copy target area after the initiation of the copy will be overwritten by data from the copy source area and all data read from the copy target area after the initiation of the copy will reflect the completion of the copy operation and will not result in reading the data previously stored in the target area. FIGS. 14 and 15 depict the steps performed by data file management system for snapshot copy operations 106 within controller 104 to achieve this second aspect of maintaining point in time copy semantics.

FIG. 14 illustrates in flow diagram form the operational steps taken by controller 104 when screening data file read requests received from processor 101 by data storage subsystem 100. At step 1401, controller 104 determines whether the data file read request specifies a Virtual Track Address which is the target of an in-progress snapshot copy operation. If the data file read request is for a virtual track which is the target of an in-progress snapshot copy operation and the update of the Virtual Track Table entry selected by the data file's Virtual Track Address has not yet been performed by the snapshot copy process, processing proceeds with step 1402.

At step 1402, controller 104 translates the Virtual Track Address of the data file which is the target of the snapshot copy operation to the Virtual Track Address of the data file which is being copied. This translated Virtual Track Address is then used for all subsequent operational steps required to complete the processor 101 read file request. In this way, data storage subsystem 100 transfers the copy source data file to processor 101 in response to the data file read request. Thus, the data file received by processor 101 in response to a data file read request that is received by data storage subsystem 100 while a snapshot copy operation is in progress in the same as the data file that would have been received by processor 101 in response to the data file read request had the snapshot copy operation been performed instantly.

Alternatively, if controller 104 determines at step 1401 that either the data file read request is not for a copy target data file or the snapshot copy operation has already copied the Track Number describing the source data file to the Virtual Track Table entry which describes the target data file, processing proceeds with step 1403. The step 1403, processor 104 uses the Virtual Track Address specified by processor 101 in the read file request for all subsequent operational steps required to complete the read file request. These subsequent operational steps are the usual steps performed by a dynamically mapped virtual storage subsystem.

FIG. 15 illustrates in flow diagram form the operational steps taken by controller 104 when screening virtual track write requests which are generated by data file management system for snapshot copy operations 106 for the purpose of writing new or modified virtual tracks to backend data storage devices 105. At step 1501, controller 104 determines whether the virtual track is the target of an in-progress snapshot copy operation and the Virtual Track Table entry selected by the Virtual Track Address of the virtual track being written is within a Virtual Track Table Page which the snapshot copy operation has not yet written to backend data storage devices 105. If this is so, processing proceeds with step 1502. At step 1502, controller 104 delays the writing of the virtual track until the in-progress snapshot copy operation has written the Virtual Track Table Page that contains the Virtual Track Table entry selected by the Virtual Track Address assigned by processor 101 when it wrote or modified the virtual track. This prevents any modified data written by processor 101 to the data file contained in the virtual track subsequent to the initiation of the snapshot copy operation from being overwritten by the data file contained in the source virtual track that is being copied.

If controller 104 determines at step 1501 that the writing of the virtual track did not have to be delayed due to the track being the target of an in-progress snapshot copy, processing proceeds with step 1503. At step 1503, controller 104 determines whether the virtual track is the source of an in-progress snapshot copy operation and the Virtual Track Table entry selected by the Virtual Track Address of the virtual track to which the current virtual track is being copied is within a Virtual Track Table Page which the snapshot copy operation has not yet written to backend data storage devices 105. If this is so, processing proceeds with step 1504. At step 1504, controller 104 delays the writing of the virtual track until the in-progress snapshot copy operation has written the Virtual Track Table Page that contains the Virtual Track Table entry selected by the Virtual Track Address of the virtual track to which the current virtual track is being copied. This prevents any modified data written by processor 101 to the data file contained in the virtual track subsequent to the initiation of the snapshot copy operation from being copied to the data file which is the target of the snapshot copy operation.

If controller 104 determines at step 1503 that the writing of the virtual track did not have to be delayed due to the track being the source of an in-progress snapshot copy, processing proceeds with step 1505. At step 1505, controller 104 allows the write of the virtual track instance to proceed without delay.

Summary

Thus, the present data file storage management system for snapshot copy operations 106 both efficiently ensures the reliability of the mapping table data and also performs an incremental copy process which preserves the point in time copy semantics to ensure copy data file correspondence to the original data file. This system maintains a two level mapping table which enables the data files to be copied using the snapshot copy process 107 and only having to update a single corresponding mapping table entry when the physical location of the data file is changed. In addition, the synchronization of the snapshot copy operation with the reading and writing of data to the original and copy data files is maintained by detecting accesses to the original data file or the copy file during the time that the snapshot copy process 107 is being executed and the mapping table is being updated.

What is claimed:

1. A data file storage management system for use in a dynamically mapped virtual data storage subsystem to maintain data file integrity in copy operations, wherein said dynamically mapped virtual data storage subsystem comprises a set of data storage devices for storage of data files, said data file copy management system comprising:

a first mapping table which associates a virtual address assigned to a received data file with an immutable identification;

a second mapping table which associates said immutable identification to a logical address which identifies a physical storage location on a one of said data storage devices for storage of said received data file;

means for storing said received data file as indicated by said logical address;

means, responsive to relocation of said stored data file, for updating said second mapping table to reflect relocation of said stored data file exclusive of updating said first mapping table; and means, responsive to a request to copy said received data file to a second virtual address, for updating said first mapping table to associate said second virtual address with said immutable identification.

2. The system of claim 1 further comprising:

means for storing a copy of said first mapping table on at least one of said data storage devices.

3. The system of claim 2 further comprising:

means, responsive to loss of said first mapping table, for retrieving said copy of said first mapping table.

4. The system of claim 1, wherein said second mapping table comprises a count field associated with each immutable identification, said count field indicative of the number of virtual addresses corresponding to said immutable identification.

5. The system of claim 1 further comprising:

means, responsive to a request to modify said received data file during processing of said request to copy said received data file to a second virtual address, for delaying storing of the modified form of said received data file on said data storage devices.

6. The system of claim 1 further comprising:

means for storing said first mapping table on at least one of said data storage devices.

7. The system of claim 1 further comprising:

means for storing a portion of said first mapping table that contains updated data on at least one of said data storage devices.

8. The system of claim 7, further comprising:

means, responsive to said means for storing said portion of said first mapping table, for updating said first mapping table to reflect location of said stored portion of said first mapping table.

9. The system of claim 8, further comprising:

means, responsive to relocation of said stored portion of said first mapping table, for updating said first mapping table to reflect said relocation of said stored portion of said first mapping table.

10. The system of claim 11 further comprising:

means, responsive to receipt of a request to modify said received data file during processing of said request to copy said received data file to a second virtual address, for delaying the storing of the modified form of said received data file on said data storage devices until after said modified portion of said first mapping table has been stored on said at least one data storage device.

11. The system of claim 1 further comprising:

means for maintaining a list of unused immutable identifications;

means, responsive to receipt of a data file having a virtual address, for selecting a one of said unused immutable identifications; and means for associating said selected unused immutable identification with said received data file.

12. The system of claim 1 further comprising:

means, responsive to a request to read a data file associated with said second virtual address during processing of said copy request and prior to association of said immutable identification with said second virtual address, for reading said data file from said physical storage location identified by said logical address associated with said immutable identification in lieu of reading data file from physical storage location identified by logical address associated with immutable identification currently associated with said second virtual address.

13. The system of claim 1, further comprising:

means, responsive to said request to copy said received data file, for determining if a portion of said received data file is located in a cache memory and has been modified, and if so, storing said modified portion to at least one of said data storage devices and updating said second mapping table to reflect logical address of said stored modified portion.

14. The system of claim 1, further comprising:

means, responsive to said request to copy said received data file, for determining if a portion of a data file associated with said second virtual address is stored in a cache memory, and if so, flushing said portion from said cache memory.

15. A method of data file storage management for use in a dynamically mapped virtual data storage subsystem to maintain data file integrity in copy operations, wherein said dynamically mapped virtual data storage subsystem comprises a set of data storage devices for storage of data files, said data file copy management method comprising the steps of:

storing data in a first mapping table to associate a virtual address assigned to a received data file with an immutable identification;

storing data in a second mapping table to associate said immutable identification to a logical address which identifies a physical storage location on a one of said data storage devices for storage of said received data file;

storing said received data file as indicated by said logical address;

updating, in response to relocation of said stored data file, said second mapping table to reflect relocation of said stored data file exclusive of updating said first mapping table; and updating, in response to a request to copy said received data file to a second virtual address, said first mapping table to associate said second virtual address with said immutable identification.

16. The method of claim 15 further comprising the step of:

storing a copy of said first mapping table on at least one of said data storage devices.

17. The method of claim 16 further comprising the step of:

retrieving, in response to loss of said first mapping table, said copy of said first mapping table.

18. The method of claim 15 further comprising the step of:

updating, in response to said step of updating said first mapping table, data indicative of the number of virtual track addresses corresponding to said immutable identification.

19. The method of claim 15 further comprising the step of:

delaying, in response to a request to modify said received data file during processing of said request to copy said received data file to a second virtual address, storing of the modified form of said received data file on at least one of said data storage devices.

20. The method of claim 15 further comprising the step of:

storing said first mapping table on at least one of said data storage devices.

21. The method of claim 15 further comprising the step of:

storing a portion of said first mapping table that contains updated data on at least one of said data storage devices.

22. The method of claim 21, further comprising the step of:

updating, in response to said step of storing said portion of said first mapping table, said first mapping table to reflect location of said stored portion of said first mapping table.

23. The method of claim 22, further comprising the step of:

updating, in response to relocation of said stored portion of said first mapping table, said first mapping table to reflect said relocation of said stored portion of said first mapping table.

24. The method of claim 21 further comprising the step of:

delaying, in response to receipt of a request to modify said received data file during processing of said request to copy said received data file to a second virtual address, the storing of the modified form of said received data file on said data storage devices until after said modified portion of said first mapping table has been stored on said at least one data storage device.

25. The method of claim 15 further comprising the steps of:

maintaining a list of unused immutable identifications;

selecting, in response to receipt of a data file having a virtual address, a one of said unused immutable identifications; and associating said selected unused immutable identification with said received data file.

26. The method of claim 15 further comprising the step of:

reading, in response to a request to read a data file associated with said second virtual address during processing of said copy request and prior to association of said immutable identification with said second virtual address, said data file from said physical storage location identified by said logical address associated with said immutable identification in lieu of reading data file from physical storage location identified by logical address associated with immutable identification currently associated with said second virtual address.

27. The method of claim 15, further comprising the steps of:

determining, in response to said request to copy said received data file, if a portion of said received data file is located in a cache memory and has been modified, and if so, storing said modified portion to at least one of said data storage devices and updating said second mapping table to reflect logical address of said stored modified portion.

28. The method of claim 15, further comprising the steps of:

determining, in response to said request to copy said received data file, if a portion of a data file associated with said second virtual address is stored in a cache memory, and if so, flushing said portion from said cache memory.

* * * * *